(12) United States Patent
Lupton et al.

(10) Patent No.: US 8,158,002 B1
(45) Date of Patent: Apr. 17, 2012

(54) RESPONSIVE GELS AND METHODS OF USE THEREOF

(75) Inventors: Elmer C. Lupton, Boston, MA (US); Thomas H. E. Mendum, Somerville, MA (US); R. Edwin Hicks, Waban, MA (US); Leslie S. Rubin, Newton, MA (US); Justyna B. Teverovsky, Acton, MA (US); Harris Gold, Lexington, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 10/380,884

(22) PCT Filed: Mar. 17, 2000

(86) PCT No.: PCT/US00/07120
§ 371 (c)(1), (2), (4) Date: Nov. 3, 2003

(87) PCT Pub. No.: WO00/54866
PCT Pub. Date: Sep. 21, 2000

Related U.S. Application Data

(60) Provisional application No. 60/124,723, filed on Mar. 17, 1999.

(51) Int. Cl.
| | |
|---|---|
| *B01D 61/00* | (2006.01) |
| *B01D 61/14* | (2006.01) |
| *B01D 61/18* | (2006.01) |
| *B01D 37/00* | (2006.01) |
| *B01D 15/00* | (2006.01) |
| *B01D 29/00* | (2006.01) |
| *B01D 35/00* | (2006.01) |
| *B01D 53/02* | (2006.01) |
| *A61K 9/22* | (2006.01) |
| *A61F 2/02* | (2006.01) |

(52) U.S. Cl. ......... 210/650; 210/86; 210/97; 210/198.2; 210/252; 210/488; 210/489; 210/490; 210/502.1; 210/503; 210/504; 210/505; 210/506; 210/507; 210/508; 424/423; 424/424; 424/425; 604/891.1; 604/892.1

(58) Field of Classification Search ............ 210/86, 210/97, 198.2, 252, 488, 489, 490, 502.1, 210/503, 504, 505, 506, 507, 508, 650, 767; 424/423, 424, 425; 604/891.1, 892.1

See application file for complete search history.

(56) References Cited

U.S. PATENT DOCUMENTS 3,421,892 A    1/1969   Taylor .............................. 96/3
(Continued)

FOREIGN PATENT DOCUMENTS

CA         02262073      *   2/1996
(Continued)

OTHER PUBLICATIONS

English translation European Patent Application No. 0367337 A1 (May 1990).*

(Continued)

*Primary Examiner* — John Kim
(74) *Attorney, Agent, or Firm* — Edwards Wildman Palmer LLP; David G. Conlin; Lisa Swiszcz

(57) ABSTRACT

The present invention provides variable pore size filters. The variable pore size filters of the present invention comprise a fabric matrix, having a set pore size, wherein the fabric matrix is coated with a gel that expands and shrinks in response to a trigger. When the gel is expanded, the pore size of the filter is small and filtering is accomplished. When the gel is shrunken, the pore size of the filter is large and cleaning of the filter by a backwash or forward flush of fluid is accomplished.

20 Claims, 18 Drawing Sheets

U.S. PATENT DOCUMENTS

| | | | |
|---|---|---|---|
| 3,421,893 A | 1/1969 | Taylor | 96/9 |
| 3,575,700 A | 4/1971 | Taylor | 96/3 |
| 3,575,701 A | 4/1971 | Taylor | 96/3 |
| 3,663,266 A * | 5/1972 | Dye | 442/77 |
| 4,830,855 A * | 5/1989 | Stewart | 424/448 |
| 4,968,533 A * | 11/1990 | Gsell | 427/245 |
| 5,120,440 A * | 6/1992 | Nemoto et al. | 210/490 |
| 5,403,893 A | 4/1995 | Tanaka et al. | 525/218 |
| 5,426,154 A * | 6/1995 | Mikami et al. | 525/296 |
| 5,534,186 A * | 7/1996 | Walker et al. | 252/194 |
| 5,643,246 A | 7/1997 | Leeb et al. | 604/890.01 |
| 5,651,979 A | 7/1997 | Ron et al. | 424/423 |
| 5,726,456 A | 3/1998 | Lupton et al. | 252/182.21 |
| 5,876,741 A | 3/1999 | Ron | 424/423 |
| 5,895,575 A * | 4/1999 | Kraus et al. | 210/483 |
| 6,030,442 A * | 2/2000 | Kabra et al. | 106/162.8 |
| 6,510,949 B1 * | 1/2003 | Grauer et al. | 210/508 |
| 6,565,872 B2 * | 5/2003 | Wu et al. | 424/426 |
| 6,855,173 B2 * | 2/2005 | Ehrnsperger et al. | 8/142 |

FOREIGN PATENT DOCUMENTS

| | | |
|---|---|---|
| EP | 0316642 B1 * | 3/1994 |
| JP | 02-269135 A | 11/1990 |
| JP | 03-032729 A | 2/1991 |
| JP | 07-136508 A | 5/1995 |
| JP | 09-141090 A | 6/1997 |
| JP | 11-049826 A | 2/1999 |
| WO | WO 95/24430 | 9/1995 |
| WO | WO 9602577 A1 | 2/1996 |
| WO | WO-96-40082 A2 | 12/1996 |

OTHER PUBLICATIONS

Y. Wang, et al., "Effects of Pretreatments on Morphology and Performance of Cellulose Acetate (Formamide Type) Membranes", Desalination, 95 (1994) 155-169.

A. Hiroki, et al., "p-Nitrophenol Permeability and Temperature Characteristics of an Acryloyl-1-Proline Mehtyl Ester-Based Porous Gel Membrane", Journal of Polymer Sciences Part A: Polymer Chemisty, vol. 38, 1495-1500 (1998).

L. Liang, et al. "Photografted Polypropylene Microfiltration Membrane and its Separation Characteristics", Pacific Northwest National Laboratory p. 53-54.

L. Liang, et al. "Intelligent Switch Prepared by Composite Crosslinked Polyn-Isopropylacrylamide-Sponge Gels", Pacific Northwest National Laboratory p. 220-221.

F. Yam, et al., "A novel Composite Membrane for Temperature Responsive Permeation", Department of Pharmaceutical Science, University of Texas. p. 312-313.

A.J. Grodzinsky, et al., "Electric Field Control of Membrane Transport and Separations", Separation and Purification Methods, 14(1), 1-40 (1985).

M. Asano, et al., "Permeation of p-nitrophenol through Membranes Containing Thermally Responsive Graft-Polymers on the Surface", JAERI_Review 98-016 pp. 104-106.

M. Yoshida, "Reversible on-off Switch Function of ion-track pores for thermo-responsive films based on copolymers consisting of Diethyleneglycol-bis-allylcarbonate and acryloyl -L-Proline Methyl ester", Nuclear Instrucments and Method in Physics Research B 122 (1997) 39-44.

English translation of Office Action issued in corresponding Japanese Patent Application No. 2000-604934, (Feb. 2010).

Lang L, et al., "*Photografted Polypropylene Microfiltration Membrane and Its Separation Characteristics*", American Chemical Society, vol. 40, No. 1, pp. 53-54 (Jan. 1, 1999).

Liang L, et al., "*Intelligent Switch Prepared by Composite Crosslinked Poly (N-Isopropylacrylamide)-Sponge Gels.*" American Chemical Society, vol. 40, No. 1, pp. 220-221 (1999).

* cited by examiner a) Straining
b) Impingement
c) Interception
d) Diffusion

US 8,158,002 B1

RESPONSIVE GELS AND METHODS OF USE THEREOF

FIELD OF THE INVENTION

This invention relates to compositions of matter and to filter systems comprising the same wherein the permeability changes in response to a trigger. More particularly, the compositions and filter systems of the present invention comprise a gel that is responsive to a trigger such as temperature, pH, ions or ionic strength, solvents, light, electric fields and magnetic fields. For example, using temperature triggered gels, upon lowering the temperature of the system to below the gel's transition temperature, the gel responds and decreases the permeability of the filter system, and upon raising the temperature of the system to above the transition temperature, the gel responds and increases the permeability of the filter system. In the decreased permeability state, filtering is accomplished. In the increased permeability state, a backwash or forward flush of fluid may be used to clean the filter system and prevent plugging of the filter system. The filter system may optionally include a substrate material on which the responsive gel is coated or impregnated.

BACKGROUND OF THE INVENTION

Filtration is a process used to remove one or more materials from a fluid. Filters to accomplish this process are of great importance to industry. Many filtration processes are used to remove contaminants from fluids ranging from drinking water to gasoline and other fuels. Yet other filtration processes are used to separate out desired materials. It is desirable for many applications that filters be capable of being regenerated for reuse.

Filters are used, e.g., in reverse osmosis (RO) systems are used on Navy ships to desalinate seawater to meet potable and high purity water needs aboard ship. Reverse osmosis (RO) is a pressure driven membrane process that is widely used for recovering pure water from saline solutions, such as seawater. In RO treatment, a high hydrostatic pressure is applied to the saline solution forcing the water through the semi-permeable membrane and leaving behind a concentrated brine solution. The rate at which product water is produced is proportional to the pressure driving force, that is, to the pressure of the feed water above its osmotic pressure. The osmotic pressure of normal-salinity seawater is around 400 psi and operating pressures generally range from 800 psi to 1000 psi. Resultant fluxes are of the order of 10 gal/ft$^2$/day.

RO systems have generally replaced distillation as the most cost-effective option for shipboard desalination of seawater. An important reason for this is that the cost of RO has decreased significantly with the development of durable, high flux membranes and relatively low-cost modular membrane systems. At the same time, escalating energy prices have increased the cost of thermal distillation which uses five to eight times more fuel than RO (See Pizzino, Joseph F. "Operation of a 2000 gallon per day Reverse Osmosis Desalination System Aboard Monob. David W. Taylor Naval Ship R&D Center, Bethseda, Md. AD-A079 834, December, 1979). To maintain the cost advantage, however, especially for smaller systems with their high costs for pumping and labor (See Kuepper, T. A. "Improved Field Performance for Reverse Osmosis Systems." Naval Civil Engineering Laboratory, Port Hueneme, Calif. TN No. N-1644. September, 1982), the RO systems must operate at or near their design rating.

The membranes used by the Navy are guaranteed to remove 99.2 percent of the dissolved salts in seawater, and rejections of 99.5 percent or better are typically achieved in practice. Assuming a 99.5 percent rejection and a total dissolved salt concentration of 35,000 mg/L TDS (10,560 mg/L Na) (See Kuepper, T. A. "Improved Field Performance for Reverse Osmosis Systems." Naval Civil Engineering Laboratory, Port Hueneme, Calif. TN No. N-1644. September, 1982), the permeate (product water) would contain some 175 mg/L of dissolved salts (50 ppm Na), which is within the accepted range for drinking water. However, the Navy also uses treated seawater for their high purity water requirements such as for boiler feedwater, cooling water for electronic equipment, and washdown of gas-turbines (See Adamson, Wayne L.; Weber, Brian E.; Nordham, David J. "Navy Shipboard Three-Pass Reverse Osmosis System for Production of High Purity Water From Seawater." *UltraPure Water* 13(2) 21-30, March, 1996). To achieve the extra purity needed for these applications, multistage RO systems have to be used. Such a system is shown in FIG. 1.

In view of the high operating pressures and high pumping costs, any decline in flux is accompanied by a significant increase in production costs. The flux declines progressively under normal operating conditions as the membranes age, requiring that they be replaced periodically, generally every three to five years. However, more rapid decreases in flux can occur due to fouling and scaling of the membrane surface (See Tansel, Barrin; Villate, Jose. "Assessment of Oil Pretreatment Technologies to Improve Performance of Reverse Osmosis Systems." Florida International University, Miami. AD A252 360, June, 1992). Fouling occurs as the result of the accumulation of particulate matter on the membrane. These particulates form a low-porosity film on the membrane and can also plug the pores of the membrane and/or the narrow flow channels in hollow fiber and spiral wound membrane modules. These problems are aggravated by compaction at the high operating pressures needed for seawater treatment.

To prevent or attenuate fouling and scaling, the seawater is pretreated with prefilters to remove fouling and scaling materials prior to processing in the RO unit. Filtration is the separation of particles from the fluid in which they are suspended by passing the fluid through a septum or filter medium (See Probstein, Ronald F. *Physicochemical Hydrodyarnics: An Introduction.* 2$^{nd}$ Edition, Prentice Hall, New York, 1996; "Solid-liquid separation via filtration." *Chemical Engineering,* 104(2), 66, 1997) The filter can be a screen, a cartridge, a sheet of fabric or canvas, or a bed of granular or fibrous material, and the process may be categorized as straining, cake filtration, membrane filtration, and deep bed or depth filtration. In cake filtration the separated solids are collected on the surface of the filter and in depth filtration the solids are collected within the pores of the medium.

Filtration can occur by four mechanisms: straining, impingement, interception and diffusion (FIG. 2). In mechanical straining 2($a$), particles larger than the pores of the medium are retained on the filter. This process is typically used for the removal of relatively large material (generally >150 μm). To remove small particles, other mechanisms are used wherein the pore sizes of filters designed to remove the small particles are generally larger than the particles being removed so as to reduce pressure losses. In impingement 2($b$), large; dense particles continue their straight-line trajectory, rather than follow the fluid streamlines, and collide with the filter medium and adhere to it. In interception 2($c$), particles that are sufficiently small follow the fluid streamlines, but still come close enough to elements of the filter medium and are collected by the filter. In diffusion 2($d$), very small particles (generally <0.3 μm) follow a random trajectory (Brownian motion) that is superimposed on the flow streamlines, and these particles collide with the filter medium.

Liquids flow through the filter by applying a pressure differential across the medium. More porous media are generally more permeable than less porous media, and, thus, require a lower pressure to achieve a given filtration rate. However, the "cutoff" size, i.e., the smallest particle that is just retained by the filter medium, is generally higher for more permeable filter mediums. Considerable filter design efforts have been directed at developing filter media with low cutoff sizes which are still sufficiently permeable to achieve relatively high fluxes without excessive pressure drop.

Cake filtration is one type of filter design wherein the filtered particles collect on the surface of the filter medium. The filter medium may be a single sheet of fabric or a membrane. As filtration progresses, a cake or bed of particles forms on the filter medium. This bed or cake or particles becomes the effective filter medium, and the pressure drop is determined by the characteristics of the particles being filtered. When filtering small particles, the cake will have a low porosity and pressure drops will build up rapidly as the cake thickens. The pressure drop across a cake filter can be described using a modified form of the Hagen-Poiseuille equation (McCabe W. L.; Smith, J. C. *Unit Operations of Chemical Engineering*. McGraw-Hill. New York. 1976):

$$\Delta P = u\mu(mR/A + r) \quad (Eq. 1)$$

where u is the velocity of the filtrate through the filter,
m is the mass of the filter cake,
A is the cross-sectional area of the filter cake
R is the specific resistance of the filter cake,
r is the resistance of the filter medium, and
μ is the viscosity of the filtrate.

In the special case of constant rate filtration, the mass of the filter cake increases linearly with time, t, according to $$m = uAct \quad (Eq. 2)$$

where c is the mass concentration of the solids in the slurry being filtered.
Eq. 1 can then be written $$\Delta P = u^2 \mu ctR + u\mu r \quad (Eq. 3)$$

This equation indicates that the pressure drop increases with the slurry concentration as well as with the flow rate. Eq. 3 also shows that provided the cake specific resistance is constant, the pressure drop increases linearly with time. In fact, the cake resistance is a function of the porosity and specific surface area of the cake, and is only constant if the cake is incompressible. With many industrial sludges, the filter cake compresses as the pressure drop increases causing the cake resistance to increase with time, and the pressure drop increases faster than indicated by the equation. The situation is illustrated in FIG. 3, which also indicates how the cake and medium resistance can be estimated from experimental data.

In depth filtration, the particles are trapped in the depths of the filter medium which is relatively thick. In principle, depth filters have pores that decrease in size progressively from the upstream to the downstream face of the filter. Consequently, larger particles are filtered near the upstream face while smaller particles penetrate into the depths of the filter before being trapped. This approach can significantly increase the loading capacity of the filter without excessive increase in pressure drop.

The pretreatment currently used on Navy ships for control of particulates consists of a coarse strainer followed by 20 μm and 3 μm cartridge filters (See Adamson, Wayne L.; Weber, Brian E.; Nordham, David J. "Navy Shipboard Three-Pass Reverse Osmosis System for Production of High Purity Water From Seawater." *UltraPure Water* 13(2)21-30, March, 1996). A cyclone separator may be used as an option to provide removal of larger, heavier particulate matter from the incoming seawater.

The cartridge filters used in the prefiltration train for shipboard RO systems are widely used in polishing operations to clarify relatively dilute suspensions or to remove very fine particles from high-purity water streams. These filters typically consist of a central porous core which supports the filter medium, and is contained in a cylindrical housing as shown in FIG. 4. A typical cartridge is 2.5 in. in diameter, 10 in. in height, and is rated for a flow rate of 1 to 20 gpm at a pressure drop, when clean, of around 1 psi. Double length cartridges and housings that hold multiple cartridges are available to meet larger flows. The cartridges are generally considered to be fully loaded when the pressure drop reaches about 10 psi, at which time they are discarded and replaced with fresh cartridges.

Cartridges are available in a wide range of filter media ranging from pleated sheets wrapped around the core to nonwoven fiber matrixes which are bonded to the core of the filter. The process of bonding the fiber matrix to the core of the filter involves cooking a "mash" of fibers to produce a pulp that is then drawn under vacuum onto the core to form a coating of filter medium of the desired thickness To provide depth filter properties, the porosity or density of the medium can be graded from the outer surface to the core by appropriately varying the vacuum as the coating thickens.

Although conventional cartridge filters are convenient to use and well suited for polishing type operations, pressure drops increase rapidly and cartridges have to be replaced frequently when handling more concentrated slurries, for example, when operating in regions of the ocean where large quantities of colloidal solids and plankton/small animal matter occasionally exist. In such regions, the strainers and filters plug rapidly, virtually disabling the filtration system. Because these particles have near-neutral buoyancy, cyclonic filters are also ineffective in such ocean regions. The plugged filters must be frequently replaced. This imposes an increased labor burden on operating personnel and results in a loss of production of treated water. In addition, an inventory of replacement filters has to be maintained and the spent filters have to be stored on the ship until the ship returns to port.

Various types of self-cleaning filters that use scrapers, brushes or liquid backwash to regenerate the filter medium are available (See "Solid-liquid separation via filtration." *Chemical Engineering*, 104(2), 66, 1997). These self-cleaning filters are useful when the solid content is high and when processing hazardous streams. Cake filters and strainers are generally more amenable to cleaning than are depth type filters.

One filter type that is readily backwashed is the precoat filter, which is a filter having a coating of porous filter aid material such as diatomaceous earth. The precoat layer filters out the particulates from the process stream. To clean the filter, the filtered particles along with some of the precoat can be periodically scraped from the filter surface, or the entire precoat and filter cake can be removed by backwashing. Although precoat filters have been found to be highly effective prefilters for RO systems (See Pizzino, Joseph F. "Evaluation of Single-Pass Seawater Reverse Osmosis Modlules and Pretreatment Techniques—Phase H." David W. Taylor Naval Ship R&D Center, Bethseda, Md. AD-A035 773, February, 1977; Johns-Mansville Sales Corporation. "Development of a Precoat Filtration Technology for Reverse Osmosis Units." Final Report AD-A109 053, Nov., 20, 1981), they are generally not suitable for military use because they have excessive labor demands, require a continuous supply of filter aid, and produce copious quantities of waste material that has to be disposed of.

Non-precoat strainer systems with cutoff ratings down to 10 to 15 µm are available (See Anon. "Strainers Find a Niche as Filters." *Chemical Engineering*, 102(6), 91-95, 1995) which can be cleaned by scraping as well as by backwashing. They can be designed to operate automatically and thus can reduce labor requirements. Polyvinyl chloride (PVC) units that do not corrode in seawater are on the market. In one design, a circular filter screen is fitted with a circular wiper blade that scrapes collected solids from the screen and pushes them downward where they are removed periodically through a purge at the base of the housing. The cleaning and purging functions are automatic. One unit rated at 60 gpm is 8 in. in diameter, 12 in. long, uses an 80 mesh (177 µm) stainless steel screen, and operates at a pressure drop of 2 to 5 psi (See Shelley, Suzanne. "Self-Cleaning Filter Keeps Pressure Drop Under Control." *Chemical Engineering*, 103(7), 149, 1996). Other designs use components which rotate or spin to reduce the rate at which the pressure drop increases and for providing a self-cleaning function. In one such system, a combination of baffles and spinning discs (1000 rpm) keeps the filter surface free of particulates (See Chementator. "Spinning Membranes Resist Fouling During Filtration." *Chemical Engineering*, 101(7), 19-20, 1994). Another design consists of three porous wall cylinders located side by side in a single housing (See Chementator. "A Filter that Cleans Itself." *Chemical Engineering*, 103(9), 21, 1996). The rapid rotation (2400 rpm) creates a scrubbing action between the cylinders that is claimed to prevent clogging. An alternative approach is to use a vibrating action to repel particulates from the filter medium (See "Filtration Equals Innovation." *Chemical Engineering*, 101(10), 119, 1994). Like spinning, vibration increases the shear at the filter surface preventing the accumulation of a dense, low-permeability filter cake.

While the above designs are capable of removing filter build-up, they are not considered suitable for many applications. Further, the moving parts are subject to wear and problems can arise should spinning systems go out of balance. Still further, they require drive motors that occupy space and can fail, and utilize seals on rotating shafts that require regular maintenance. Vibrating systems are unacceptably noisy and can lead to enhanced rate of equipment failure.

What is needed is a filter that may be repeatedly regenerated by simple backwash or forward flush cleaning. In the case of filters used to desalinate seawater aboard a ship, it is desirable to have a filter that is able to meet the potable and high purity water needs aboard the ship and which is capable of filtering a variety of seawater temperatures and salinities.

DECRIPTION OF THE DRAWINGS

SUMMARY OF THE INVENTION

Figure 1:
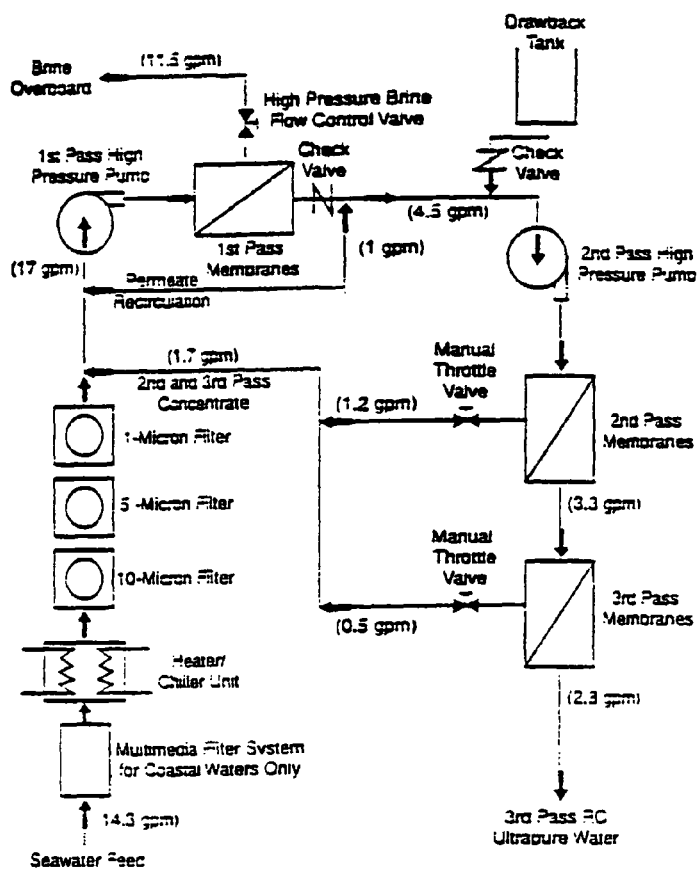
FIG. 1 shows one embodiment of a multistage RO system.
Figure 2:
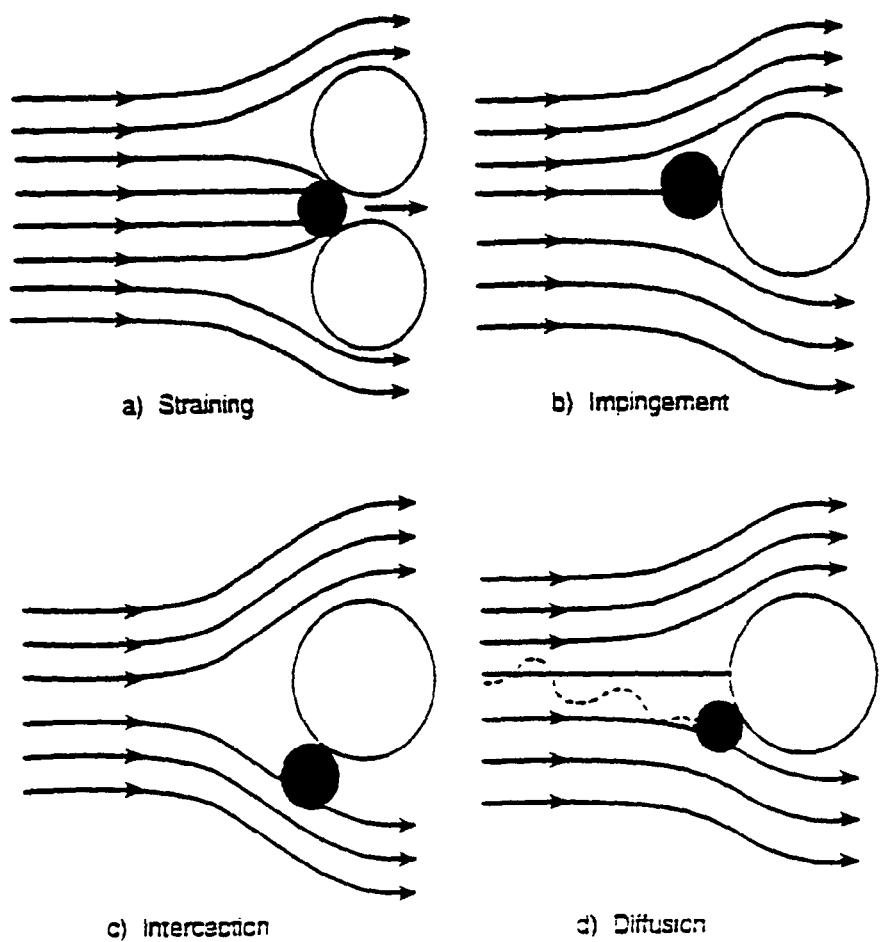
FIG. 2 shows four filtration mechanisms: straining, impingement, interception and diffusion.
Figure 3:
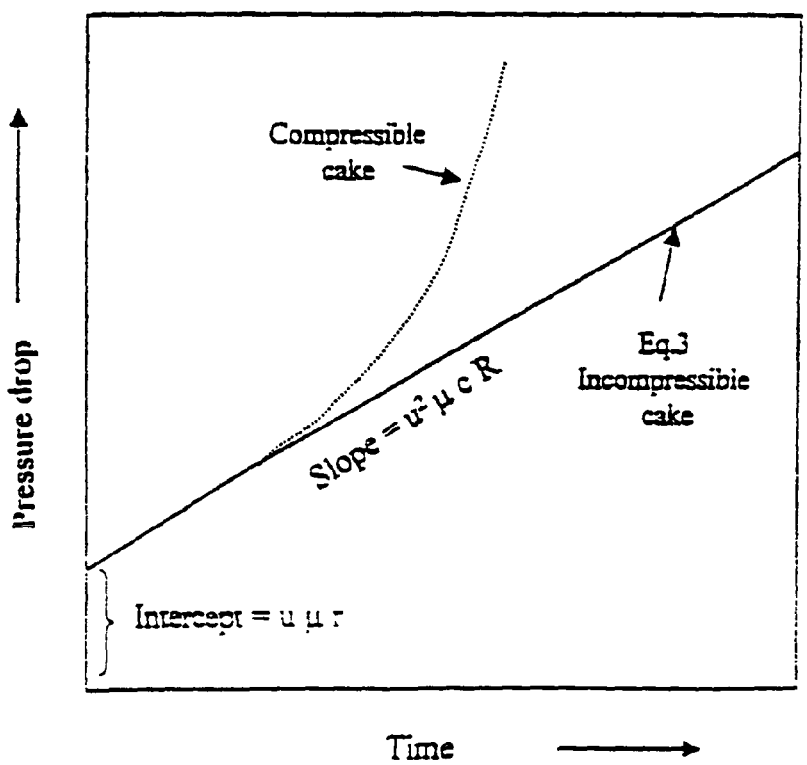
FIG. 3 shows pressure drop of a cake filter as a function of time.
Figure 4:
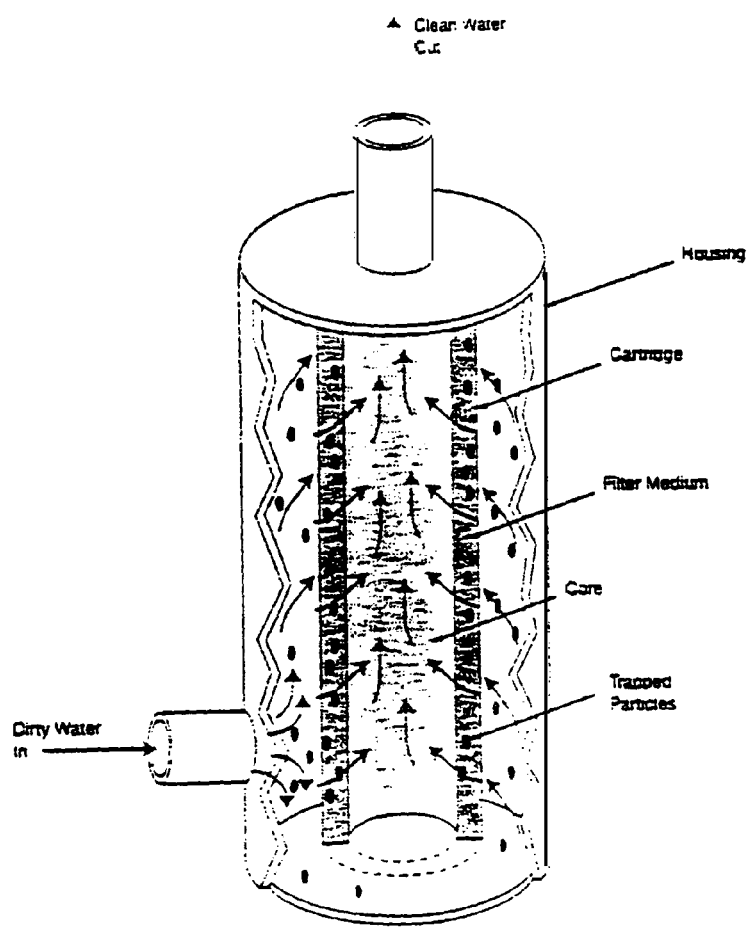
FIG. 4 show one type of cartridge filter.

It has now been discovered that compositions of matter and filter systems can be made with variable permeability by the use of responsive gels. The compositions of matter and the variable permeability filter systems of the present invention are suitable in a wide variety of filtering processes, including filtering processes carried out in both aqueous and non-aqueous environments. One particularly preferred use of the compositions of matter and the variable permeability filter systems is for removing particulate matter from water to be treated by RO systems, especially on ships where the maintenance and inventory requirements of conventional filters impose substantial hardship.

In one preferred embodiment, the composition of matter comprises a responsive gel having interstitial pores or voids wherein a fluid can be passed through the composition of matter to accomplish filtration of the fluid. The fluid may be aqueous, non-aqueous, substantially aqueous or petroleum based. The interstitial pores of the composition of matter preferably undergo changes in volume and/or structure in response to at least one trigger, and such changes may lead to permeability changes through the composition of matter. These changes in volume, structure and permeability are reversible. Suitable triggers may include, for example, a change in the environment of the composition, including temperature, solvent, pH, ions, ionic strength, light, electric field, magnetic field or pressure, and, preferably, the trigger is a temperature change.

Preferred compositions of matter in some embodiments of the present invention include those with a transition temperature of greater than about 95° F. The transition temperature is preferably greater than 95° F. in seawater for applications carried out in such environments. These transition temperatures may be modified to provide a predetermined transition temperature by modifying the hydrophobic or hydrophilic characteristics of the composition.

Preferably, the responsive gel is a polymer gel comprising at least one polymer. In some embodiments, the polymer may be cross-linked. In one preferred embodiment, the composition of matter comprises hydroxypropylcellulose (HPC) or hydroxypropyl methyl cellulose (HPMC). The HPC or HPMC may further be cross-linked. Preferred cross-linkers for use with HPC and HMPC are those derived from a polyacid, such as adipic acid based or succinic acid based cross-linkers. Adipoyl chloride and succinyl chloride and two such cross-linkers useful in the practice of the present invention.

Responsive gels are known and are described, for example, in U.S. Pat. Nos. 5,726,456; 5,403,893; 4,732,930; 5,242,491; 3,421,892; 3,421,893; 3,575,700; 3,575,701; and reissue patent RE 35,068; PCT Publications WO 95/24430; WO 97/00275; WO 96/02276 WO 96/02577A1; "Synthesis and Characterization of Thermally-Responsive Hydroxypropyl Methylcellulose Gel Beads." Stephen M. O'Connor, Stevin H. Gehrke, Journal of Applied Polymer Science Vol 66, 1279-1290 (1997); "Microporous, Responsive Hydroxypropyl Cellulose Gels. 1. Synthesis and Microstructure Bhagwati G. Kabra, Stevin H. Gehrke, Richard J. Spontak *Macromolecules* 1998, 31, 2166-2173; "Factors Determining Hydrogel Permeability" Stevin H. Geherke, John P. Fisher, Maria Palasis, Meghan E. Lund. *Annals of the New York Academy of Sciences*, p. 179-207; and "Molecular Design of Novel Thermo-responsive Hydrogel Membranes and Their Applications" Hiroki Katono and Naoya Ogata. *Membrane,* 17 (4) 238-245 (1992), all incorporated herein by reference.

Responsive gels include materials that change in volume in response to a change in their environment. The change in environment is called the "trigger", and the trigger may be, for example, a temperaure change, pH change, change in the ions present in a solution or in the ionic strength of a solution, the solvent composition, presence of light, and presence of an electronic or magnetic field. The responsive gel is formed of a crosslinked polymer network. When the gel is triggered. the polymer network of the gel contracts and/or expands in volume. The volume of such a gel may, under certain circumstances, change reversibly by a factor as large as several hundred when the gel is presented with a change in its environment. (See Tanaka, *Phys. Rev. Lett.* 40(12), 820-823 (1978); Tanaka et al, *Phys. Rev. Lett.* 38(14), 771-774 (1977); *Phys. Rev. Lett.* 45(5), 1636 (1980); Ilavsky, *Macromolecules* 15, 782 (1982); Hrouz et al., *Europ. Polym. J.* 17, 361 (1981); Ohime et al. *J. Chem. Phys.* 8. 6379 (1984); Tanaka et al. *Science* 218, 462 (1982); Ilavsky et al. *Polym. Bull.* 7, 107 (1982); Gehrke, "Responsive Gels: Volume Transitions II": Editor: K. Dusek Springer-Verlag New York, N.Y., pp. 81-144 (1993); Li et al. *Annual Rev. Mater. Sci.* 22, 243-77 (1992); and Galev et al. *Enzyme Microb. Technol.* 15, 354-66 (1933), all incorporated herein by reference.

The responsive gels of the present invention may be any known responsive gel. When used on ships to desalinate seawater, the responsive gels of the present invention are preferably thermally responsive gels because of the ease in changing the temperatures of the medium in which these gels are used. Gels which are thermally responsive in an aqueous medium expand and hold fluid below the gel's transition temperature and shrink, releasing fluid when the gel is heated. There are also gels which exhibit a thermal response when placed in organic (non-aqueous) media. These gels are generally different in chemical composition from responsive gels appropriate to aqueous media, and the nature of their response to a change in temperature is the opposite of the way that aqueous thermally responsive gels respond. That is, when the non-aqueous thermally responsive gel is exposed to an environment below its transition temperature, it shrinks, expelling fluid, and when it is exposed to temperatures above the transition temperature it swells, absorbing liquid. Thus, to return to the aqueous case, a gel which is thermally responsive in aqueous solution provides reduced permeability to particulate matter when below its transition temperature but provides increased permeability, allowing flushing of the filter, when in its collapsed state above the transition temperature.

In filtering applications, the particular responsive gels would, be selected based on the particular application and environment in which the filter system is to be utilized. Thus, for example, for thermally responsive gels, the preferred gels would be those with a transition temperature chosen to prevent unintentional triggering of the gel.

Two particularly preferred thermally responsive gels for use in the filter systems of the present invention include hydroxypropylcellulose (HPC), which has a transition temperature of about 113° F. in salt-free water, and hydroxypropyl methyl cellulose (HPMC), which has a transition temperature of about 149° F. in salt-free water. Both HPC and HPMC comprise FDA approved base polymers. However, controlled testing of HPC and HPMC indicate that the transition temperature decreases with increasing salt concentration. As a result, the transition temperature in seawater is about 98° F. for HPC gel and around 140° F. for HPMC gel. Thus, HPMC gel is more preferred than HPC for seawater filtering applications where the seawater temperatures may reach 95° F. levels.

In one embodiment of the present invention, the or composition of matter forms the filter system and the permeability of the filter system depends wholly on the changes in the permeability of the composition of matter. Preferably the composition of matter is a responsive gel. In such embodiments, the responsive gels may be formed into any desired shape and dimensions.

In another embodiment, the responsive gel is impregnated in or coated on a substrate material. A variety of materials and designs may be used as the substrate material in the filter systems of the present invention. For example, a cartridge-type depth filter may be made by using one of four different support materials: yarn, woven fabric, reticulated foam, and non-woven fibers. The substrate may be designed to have a predetermined permeability that will depend on the particular filtering application. A selected responsive gel is then coated on or impregnated in the substrate material to provide variable permeability. In the case of thermally responsive gels, when the responsive gel is below its transition temperature, the permeability of the filter system decreases. In the decreased permeability state, the filter is capable of capturing particles of, reduced size, substantially reducing the amount of particles passing with the filtered water. When the gel is above its transition temperature, the permeability of the filter system increases. In the increased permeability state, the filter no longer retains the captured particles, and these particles may be removed with a backwash or forward flush of water to clean the filter.

In one embodiment, the variable permeability filter system is designed as a RO prefilter with a responsive gel coating a fiber matrix substrate to leave pores. In such a system, the increase and decrease in the permeability of the filter system would be substantially a result of the shrinking and expanding of the gel to change the pore size of the fiber matrix. The permeability of the gel itself may or may not contribute to the overall permeability of the filter system. If a gel that is inert with respect to the solvent and particulates being filtered, then the gel would not contribute to the permeability of the filter system. Thus, when the gel is operating in an aqueous medium, for example, when the temperature of the gel is below its transition temperature, the gel is expanded and the pores of the filter decrease in size. Further, the permeability through the gel itself may be decreased below the transition temperature, thereby further decreasing permeability of the filter system. Then when the temperature of the gel is above its transition temperature, the gel is shrunken, and the pores of the filter increase in size. Further, the permeability through the gel itself may be increased above the transition temperature, thereby further increasing permeability of the filter system. In such a system, the gel would be in its expanded state during filtering, and in its shrunken state when backwashing/forward flushing and cleaning of the filter is carried out. In some embodiments, the gel may, for example, completely close up the pores of the matrix, such that the permeability of the filter system is wholly dependent on the changes in permeability through the gel itself.

In another embodiment, the substrate material is a reticulated foam, and the responsive gel is impregnated or coated on the reticulated foam.

The process for filtering a fluid would be accomplished by allowing the fluid to pass through the filter systems described above. In one embodiment, the HPC or HPMC gel coated filter system may be used to filter seawater as follows: (1) the temperature of the responsive gel is maintained below its transition temperature, so the gel is in its expanded state (decreased permeability) and filtering of the seawater is accomplished; (2) when the filter becomes loaded, the filter permeability is increased substantially by providing a trigger, such as by raising the temperature of the gel to above its transition temperature causing it to collapse and shrink (increase in permeability), this may be done during or subsequent to the filtration, (3) a means to release and flush trapped particles from the filter medium would then be provided, for example, a backwash or forward flush of water may be provided to release and flush trapped particles from the filter medium, and (4) upon completion of the filter cleaning, a trigger is provided and the gel is made to expand (decrease in permeability) by, for example, cooling it to below its transition temperature, and filtering is again carried out. This process may be repeated indefinitely.

The step of maintaining the gel below its transition temperature may be accomplished, for example, simply by providing the seawater being filtered, since the seawater may range in temperature from about 28° F. to about 95° F., and the transition temperature of both HPC and HPMC is above 95° F. The step of raising the temperature of the gel to above its transition temperature may be easily accomplished by, for example, providing a flow of warm water across the filter, wherein the warm water is about 0.1° C. (32.18° F.), and more preferably, is about 5° F. (41° F.) or higher It may be sufficient just to heat the water in the filter housing or in a small vessel of filtered water provided specifically for backwashing/forward flushing. One may also use one of the many sources of hot water on ships for raising the gel temperature. Alternatively, rather than using a backwash or forward flush of heated water to heat the gel, the filter medium itself might be heated, for example by making the support matrix from low conductivity material and heating it electrically, or incorporating heating elements in the filter or filter housing. The step of then lowering the temperature of the gel from above its transition temperature to below its transition temperature may also be easily accomplished by, for example, providing a flow of cool water across the filter, such as the water being filtered.

As used herein, the following definitions apply: "lower critical solution temperature" refers to the maximum temperature at which a polymer is soluble in a solvent. Specifically, lower critical solution temperature is the temperature at which a hydrophilic polymer loses its solubility in water; "upper critical solution temperature" refers to the minimum temperature at which a polymer is soluble in a solvent. Specifically, upper critical solution temperature is the temperature at which a hydrophobic polymer loses its solubility in an organic solvent; "crosslinker" refers to a molecule which can react with two or more polymer chains, or can be incorporated into two or more polymer chains during synthesis which attaches the two chains together. This attachment is usually permanent, and formed from covalent chemical bonds, however, other methods of crosslinking which rely on ionic, hydrophobic, van der Waals or other intermolecular forces are possible. For example, calcium cations are used to crosslink (anionic) alginate polymer chains; "polymer network" refers to a group of individual polymer strands which have been sufficiently crosslinked so that they are all connected to each other, often through multiple crosslinking sites. The molecular weight of a polymer network is infinite for all practical purposes; "gel" refers to a material that consists of a polymer network swollen in a solvent or mixture of solvents. The properties of the gel arise from the nature of the polymer network, the solvent, and the interactions between the two. Gels have properties intermediate between those of liquids and solids, and some physical properties which are unique. This term is also sometimes used to refer to a polymer network from which all the solvent has been removed, with the implied understanding that when used in an application the polymer network will be interacting with a solvent or solvents; "responsive gel" refers to a gel that undergoes a (usually discontinuous) volume phase transition when exposed to a change in its environment (a stimulus or trigger) such as temperature, light, solvent change, change in pH, an electric or magnetic field, pressure and ionic strength. A responsive gel has interstitial pores or voids which change in response to the trigger.

Other aspects of the invention are discussed infra.

DETAILED DESCRIPTION OF THE INVENTION

The present invention provides compositions of matter and filter systems having variable permeability. More specifically, the compositions of matter and the filter systems of the present invention compriseresponsive gel. The responsive gel may optionally be coated on or impregnated in a substrate material.

The compositions of the present invention comprise at least one responsive gel having interstitial pores or voids. An aqueous or non-aqueous fluid can be passed through these compositions to accomplish filtration of the fluid. In order for filtration to be accomplished, the flow of fluid through the responsive gel is greater than the flow that would be provided by diffusion of the fluid through the responsive gel. The volume of the interstitial pores or voids can be changed in response to at least one trigger to permit the filtered material retained by the responsive gel to be removed or substantially removed therefrom. In one preferred embodiment, the filtered material is removed to permit reuse and/or decontamination of the composition. In some preferred embodiments, the filtered material is itself a desired product.

In one preferred embodiment of the present invention, the variable permeability filter systems controllably transition back and forth between a decreased permeability and an increased permeability. While in the decreased permeability state, the variable permeability filter system of the present invention is in its filtering mode and is used to filter particles from a stream of fluid. When in its large permeability state, the variable permeability filter system of the present invention is in its cleaning mode and is backwashed or forward flushed with water to rid the filter of build-up, thereby regenerating the filter. The variable permeability filter systems of the present invention are particularly useful in filtering systems on ships, for example, in Navy ship filtering systems to desalinate seawater to meet potable and high purity water needs aboard the ship.

Responsive gels are materials that undergo a phase transition and dramatic change in volume and other properties in response to a change in their environment. These materials are known and were first studied extensively by Prof. Toyoichi Tanaka of the Massachusetts Institute of Technology (See Tanaka, T., Ishiwata, S. and Ishimoto, C., "Critical Behavior of Density Fluctuations in Gels," *Phys. Rev. Lett.*, 38, 771-774, 1977; Tanaka, T., "Collapse of Gels and the Critical Endpoint," *Phys. Rev. Lett.*, 40, 820-823, 1978; and Li, Y. and Tanaka, T., "Phase Transitions of Gels," *Annu. Rev. Mater. Sci.*, 22, 243-277, 1992). A key property of a responsive gel is its "trigger" which is the environmental change that causes it to change volume and physical properties. Among the triggers associated with various types of responsive gels are: changes in temperature, the pH of a solution, the ions present in a solution or in the ionic strength of a solution, the solvent composition, presence of light, and presence of an electric or magnetic field. Responsive gels may be synthesized or may be derived from naturally occurring polymers. Any of these types of responsive gels and trigger mechanisms may be used in the practice of the present invention.

In ship applications, wherein seawater is being filtered, the temperatures of the seawater generally range from about 28° F. to about 95° F. depending on the location. Thus, the transition temperature of the responsive gel for such applications is preferably greater than 95° F. to prevent unintentional triggering of the gel. Although the variable pore size filters of the present invention are typically used upstream the RO filter in ship applications, and substances inadvertently released from the filter would probably be removed in the RO treatment, it is preferred that materials in fabricating the variable pore size filter, including the responsive gels, be FDA approved since the water that is filters in such applications may ultimately be ingested. In practice, the RO membranes might have tears, rips or other small defects which might pass a small amount of any material that is leached or separated from the filter.

Two particularly preferred responsive gels for use in the practice of the present invention include hydroxypropylcellulose (HPC) and hydroxypropyl methyl cellulose (HPMC). HPC and HPMC are naturally occurring polymers. HPC has a transition temperature of about 113° F. in salt-free water, and a transition temperature of about 98° F. in salt water. The chemical structure of HPC is shown below:

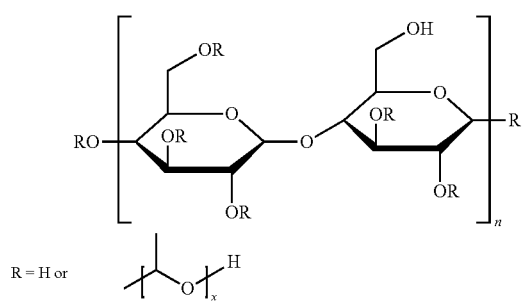

HMPC has a transition temperature of about 149° F. in salt-free water, and a transition temperature of about 140° F. in salt water. The chemical structure of HMPC is shown below:

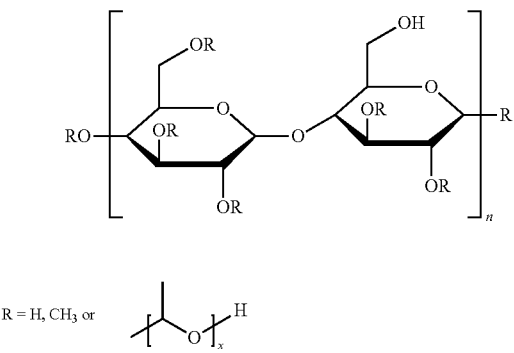

The synthesis of responsive gels is known in the art. Responsive gels may be made from any polymer which forms a responsive polymer network upon crosslinking. The polymer may be used individually or may be blended with other polymers. If the polymer is to be polymerized from its constituent monomer, other monomers, including crosslinking monomers, may be polymerized at the same time, allowing the properties of the polymer to be tailored. Additionally, the polymer may be an interpenetrating polymer network, in which at least one polymer interpenetrates the polymer network of another polymer. Generally, the polymer may be a polysaccharide (including cellulose, starch, chitin and hyaluronic acid), polypeptides, and synthetic polymers, such as polyvinyl alcohol, polyethylene oxide, and poly(isopropylacrylamide).

The responsive gels may be formed by crosslinking existing polymer chains by an appropriate agent. This approach is particularly useful to crosslink cellulose ethers. In another embodiment, polymerization of monomers can be conducted in the presence of a crosslinking agent. This approach is particularly useful to form gels from vinyl derived monomers by free radical polymerization.

An example of a synthetic gel with a lower critical solution temperature (LCST) is N-isopropylacrlyamide This gel is prepared by free radical polymerization, as described below in Example 12. The LCST of isopropylacrylamide polymer and the gel made from it is 32-34° C. When the temperature of an isopropylacrylamide gel is raised above this, it becomes opaque and expels water.

Preferably, the responsive gel of the present invention is prepared from a crosslinkable cellulose ether polymer that has a Lower Critical Solution Temperature. In preferred embodiments, the responsive cellulosic gel includes hydroxypropyl methylcellulose or hydroxypropyl cellulose, or mixtures thereof, optionally blended with methyl cellulose (MC), hydroxyethyl cellulose (HEC), carboxymethyl cellulose (CMC), ethylhydroxyethyl cellulose (EHEC), and methylhydroxyethyl cellulose (MHEC), and mixtures thereof. A most preferred cellulose ether is HPMC because of its high LCST in both fresh and sea water. Blends of cellulose ethers result in responsive gels with properties imparted by all cellulose ethers used. IPNs of a cellulose ether with another, non-cellulose ether polymer can result in a responsive gel with properties typical of the cellulose ether component.

Crosslinkers suitable for polymers include acetaldehyde, formaldehyde, glutaraldehyde, diglycidyl ether, diisocyanates, epichlorohydrin, dimethylol urea, phosphoryl chloride, trimetaphosphate, trimethylohnelamine, polyacrolein, and ceric ion redox systems.

Exemplary crosslinkers for cellulose ethers such as HPC and HPMC include, but are not limited to, the following: divinyl sulfone; dicarboxylic acid derivatives such as diacid chlorides, dicarboxylic acids, diesters, and diamides; diisocyanates; and diepoxides. Examples of dicarboxylic acid derivatives include, but are not limited to, adipoyl chloride, adipic acid, the methyl diester of adipic acid, and the diamide of adipic acid. Further examples of dicarboxylic acid derivatives include succinyl chloride, succinic acid, and the diester and diamide derivatives of succinic acid. Another example of a diacid is ethylene glycol dimethacrylate. An example of a diisocyanate is hexamethylene diisocyanate. An example of a diepoxide is bisphenol A. It will be readily apparent to one skilled in the art that it is possible to use many other dicarboxylic acid derivatives, diisocyanates, and diepoxides other than those explicitly mentioned above without departing from the scope of the invention. It will also be readily apparent to one skilled in the art that crosslinkers which have heterogeneous functionality may also be successfully employed, for example, an adipic acid derivative which has an acid functional group on one end and an ester moiety on the other. Similarly, it does not depart from the scope of the invention if one uses a crosslinker with an ester functionality and an isocyanate. Finally, it is possible to use as crosslinkers multifunctional molecules with functionality of three or more without departing from the scope of the invention, including polymeric materials, as long as a covalent bond is formed between the crosslinker and polymer chains that are linked. An example of such is 1,2,3,4-butanetetracarboxylic acid. Adipic acid and succinic acid are both listed on the GRAS (Generally Recognized As Safe) list by the FDA (Code of Federal Regulations. Title 21, Volume 3, Section 172. "Food Additives Permitted for Direct Addition to Food for Human Consumption." Section 172.870 (HPC) and Section 172.874 (HPMC). 21CFR172.870, 21 CFR 172.874, and 21 CFR 184.1. Government Printing Office. Apr. 1, 1999), and are therefore preferred cross-linkers for certain applications.

Exemplary crosslinkers for free radical polymerizations include N,N-methylenebisacrylamide, divinyl benzene, and other di- or multi-functional vinyl compounds.

Typical crosslinkers are added in the ratio of from about 1 to about 20 percent of the dry weight of the polymer after it is in solution. Changing the crosslinker and the amount of crosslinking provides a means of controlling the gel's mechanical strength, swelling degree, and intensity of the volume change trigger.

Free-radical initiators may further be utilized during the synthesis of the responsive gels. The initiator may be a free radical initiator, such as chemical free radical initiators and ultraviolet or gamma radiation initiators. Conventional free radical initiators may be used according to the invention, including, but in no way limited to ammonium persulfate, benzoin ethyl ether, 1,2'-azobis(2,4-dimethylpentanitrile) (Vazo52), and azobisisobutyronitrile (AIBN). Initiation may also be accomplished using cationic or ionic initiators. Many variations of these methods will be apparent to one skilled in the art and are contemplated as within the scope of the invention.

In one preferred synthesis, HPC or HPMC is reacted with adipoyl chloride or succinyl chloride (both commercially available), as illustrated below:

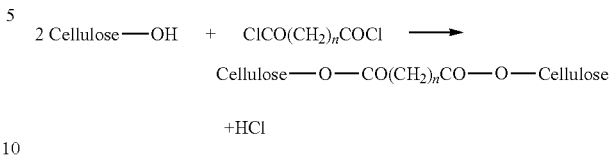

Wherein n=4 for adipoyl chloride and n=2 for succinyl chloride.

In another preferred synthesis, HPC or HPMC is reacted with divinyl sulfone, as illustrated below:

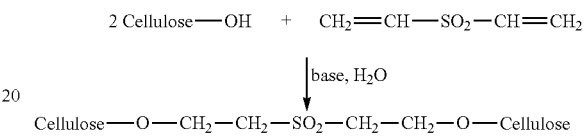

These reactions involve a diester or ether cross-linkage formed by the reaction of the adipoyl chloride, succinyl chloride, or divinyl sulfone with the hydroxyl groups on the cellulose polymer.

The selection of the solvent for the gel synthesis is very important. Water and organic solvents with active hydrogens like alcohols and amines will react with adipoyl and succinyl chloride and so cannot be used. Hydrocarbon and ether solvents frequently used for ester synthesis do not swell the highly hydrophilic cellulosics and are unsatisfactory. It has been found that anhydrous low molecular weight ketones like acetone and methyl ethyl ketone swell HPC and HPMC sufficiently to synthesize the gels, and are preferred solvents.

Through molecular modifications, small changes can be made in the transition temperature of the responsive gels. As a general rule, hydrophobic modifications of the gel will lower the transition temperature of the gel, while hydrophilic modifications will raise the transition temperature. The hydrophobic modifications may be made by reaction with small quantities of hydrophobic acid chlorides, like octyl or decyl chloride, to produce a small amount of long chain ester linkages. Hydrophilic modifications may be made by reaction with small quantities of acid anhydrides of GRAS diacids like succinic anhydride. This will produce a succinate half ester with a highly hydrophilic carboxylate anion.

A variety of materials and designs may be used as the support material including, for example, one dimensional and three dimensional supports. Materials such as yarn, woven fabric, reticulated foam, and non-woven fibers may be used in the design of these filter substrates.

In some applications, it is preferred to use depth (three dimensional) filters in the practice of the present invention. In such filters, the filtered particles are held within the filter medium, and regeneration by backwashing/forward flushing is greatly facilitated by increasing the pore size of the filter. An important advantage to using three-dimensional depth filters, as opposed to a flat yarn or string matrix, is that the three-dimensional materials retain their mechanical integrity during the swelling and collapsing cycles without the need for additional support.

Suitable depth filters include cartridge-type depth filters, which may be made by using one of four different support materials: yarn, woven fabric, reticulated foam, and non-woven fibers.

Yarn or string-wound cartridge depth filters are currently available commercially. These filters are constructed simply by winding a suitable yarn around the filter core. Filter pore size is determined by the tension of the winding and by the diameter of the string. By using gel-coated string or yarn, these filters could be made to be regenerable by backwashing/forward flushing. In addition to adjusting the tension and the diameter of the string, the gradation in permeability can be achieved by varying the thickness of the gel coating Fabric depth filters in accordance with the present invention may be made by wrapping several layers of gel-coated fabric around the cartridge core. Filter pore size is determined by the mesh size of the fabric and the thickness of the gel coating. Using a more open weave or reduced coating thickness for each successive layer will provide the filter with smaller pore sizes required for depth filtration. In this type of design, the flow of cleaning fluid preferably flows from inside to outside so as to keep the fabric under tension and separated when the gel is in the collapsed state.

Reticulated foam depth filters are foams in which cell membranes have been fused with cell ribs to leave an open-celled material. Reticulated foams are available commercially in a range of cell or pore sizes, and are widely used as filter media for air and liquid flows. They are routinely impregnated with substances such as activated carbon or bacteriostatic agents to meet specific filtration duties. In accordance with the present invention, the reticulated foam would be impregnated with gel to coat the cell walls. The desired final pore size can be obtained by selecting a particular pore size of the untreated foam and by varying the thickness of the gel coating. Once impregnated, the reticulated foam can be simply wrapped around and fastened to the cartridge core.

Alternatively, a non-woven fiber filter medium can be prepared by producing a pulp of the fibers that is then drawn under vacuum onto the filter core. The porosity can be graded from the outer surface to the core by appropriately varying the vacuum as the coating forms. In accordance with the present invention, a responsive gel is embedded in the matrix. One method of embedding the responsive gel in the matrix would be to soak the matrix with polymer solution and allow gelation to occur in the pores. Alternatively, gel particles can be added to the pulp before it is cast.

For each of these substrate designs, the porosity of the filter system may be additionally modified, for example, by modifications to the responsive gels during synthesis. For example, by modifying the crosslink density, initial polymer concentration, polymer molecular weight and branching during synthesis, the permeability of the filter system may be modified as desired.

In some applications, the responsive gel may be inert with respect to the solvent and particulates that the filter encounters, and serves only to coat the substrate and close off the pores of the substrate to a greater or lesser extent. In other applications, the permeability of the polymer network that makes up the responsive gel is the determining factor with regard to particle size cutoff, while the substrate merely provides physical support for the gel. In this model, the properties of the gel are altered (e.g. amount of crosslinking, synthesis conditions, etc.) to tailor the particle size cutoff of the filter to any particular purpose. The permeability of the substrate is chosen to be much higher than the highest permeability of the gel so that the substrate plays only a structural role.

In yet another application. the variable permeability filter might be constructed to have a substrate with a permeability below the maximum permeability of the gel but above the minimum permeability of the gel. In such applications, both the substrate and the gel would play a role in the permeability changes of the filter system. This might be advantageous in restricting the operating range of the filter to a smaller range than could be provided by the gel alone; alternatively, if additional structural integrity were desired, it might be important to compromise the operating range of the gel in order to obtain increased durability.

Additionally, it is entirely within the scope of the invention to consider a variable permeability filter which is comprised only of a gel, without a substrate. If the structural integrity of the gel is high, as it tends to be with the natural cellulosic polymers used in the examples, there is no reason that a substrate must be included.

For applications employing a substrate material impregnated or coated with a responsive gel, creating a strong bond between the gel and the substrate material is important for producing a durable filter medium. Several techniques may be used to enhance substrate to gel bonding, including: mechanical bonding; chemical pretreatment of the filter fiber; and gel pretreatment of the fiber.

In mechanical bonding, the gel itself can have substantial mechanical strength and tenacity. If the filter fiber has a relatively rough surface, particularly if it has microfibrils as natural fibers often do, the gel can become mechanically entangled with and bonded to the fiber. This can give adhesion that is sufficient for the application.

Chemical pretreatment of the filter fiber can be used to enhance bondability and surface reactivity of the fiber. Since many fibers contain active hydrogens, a pretreatment can be performed using the same chemicals that create gel cross-links, as described above. These materials are bifunctional or polyfunctional and in the chemical pretreatment, one functionality is bonded onto the fiber while other functionalities are left active. The residual functionalities are then bonded onto the gel polymer backbone in a second step. This process using both an ester pretreatment and an urethane pretreatment is shown below:

Chemical Ester Pretreatment:

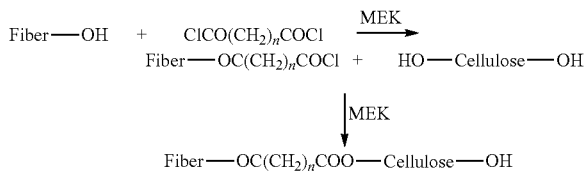

Chemical Urethane Pretreatment:

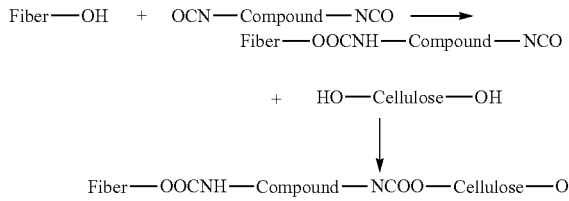

Gel pretreatment of fiber may also be carried out, wherein a thin layer of tightly cross-linked, concentrated gel, which swells very little, is applied to the fiber. A second layer of the dilute gel will then be applied and firmly bond to the initial gel layer.

Because the filtered water may be used for drinking purposes, materials used in the manufacture of the filter, including the manufacture of the fabric matrix, is preferably nontoxic, since there is a remote possibility that small amounts of the fiber matrix may be separated from the filter and end up in the product water.

The operation of depth filters in accordance with the present invention, wherein a thermally responsive gel is utilized, can be explained as follows: When the filter is in the normal or cold state (below transition temperature), the responsive gel will be swollen so that the pores of the media are reduced to the required dimensions to remove the target cutoff particle size. Flow rates during filtration are preferably in the 2 to 10 gal/min/ft² range, depending on the support material and cutoff particle size. As filtration progresses and particles become trapped in the depth of the media, the pressure drop across the unit will increase. The situation is different from cake filtration (Eq. 3) in that the porosity of the medium decreases due to the accumulation of filtered particles. This causes the filter resistance to increase as filtration proceeds. The resulting increase in pressure drop can be estimated on the basis of a modified D'Arcy type equation for flow through porous media which explicitly includes the porosity effect (See *Perry's Chemical Engineers' Handbook*. Robert H. Perry, Don W. Green and James O. Maloney, eds. 7th Edition. McGraw Hill, New York, 1997):

$$\Delta P = 200 \mu u L/D^2 (1-\epsilon)^2/\epsilon^3 \text{ for } Re < 100 \text{(laminar flow)} \quad (4)$$

where:
u is the superficial (open channel) velocity through the filter medium,
L is the depth of the filter medium
D is a representative (pore) diameter of the filter medium,
$\epsilon$ is the porosity of the filter medium, and
$\mu$ is the viscosity of the filtrate.
Re is the Reynolds number (Re=D$\rho$V/$\rho$) and
$\rho$ is the density of the filtrate.

Figure 7:
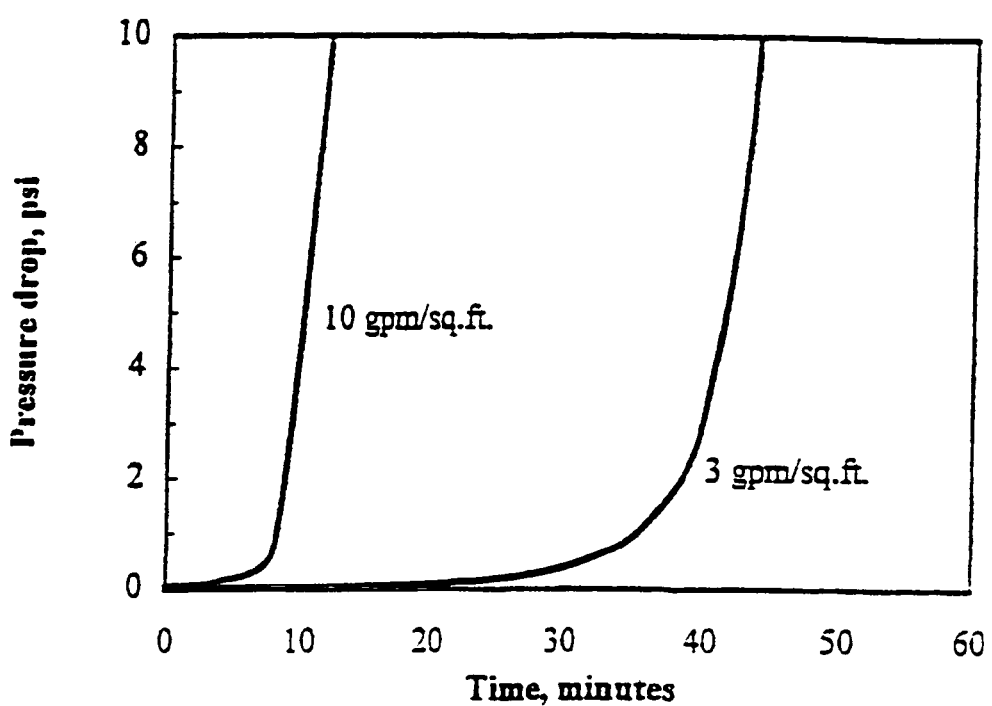
FIG. 7 shows changes in pressure drop with time for a depth filter for fluxes of 3 and 10 gal/min/ft$^2$ and a solids loading of 1000 mg/L.

The response of Eq. 4 is illustrated by a specific example: Assuming a uniform initial porosity of $\epsilon$=0.5, a pore diameter of 0.1 mm (100 μm), and a filter rate of 3 gal/min/ft² (V=2 mm/s), the initial pressure drop across a 0.5 in. thick filter is calculated to be 0.15 psi (1 kPa). On increasing the flow to 10 gal/min/ft², the pressure drop would be 0.5 psi. Assuming the particles that are filtered are collected uniformly throughout the filter medium, the decrease in porosity with time can be calculated from the initial pore volume, the solids content of the liquid being filtered, and the rate of filtration. The pressure drop can then be estimated using Eq. 4. The change in pressure drop with time is shown in FIG. 7 for fluxes of 3 and 10 gal/min/ft² and a solids loading of 1000 mg/L.

The equation indicates that the pressure increases slowly at first, but due to the non-linearity of the porosity function, $(1-\epsilon)^2/\epsilon^3$, there is a very rapid increase in pressure as the pores become filled. At higher flow rates or higher slurry concentrations, the filter becomes loaded more quickly and regeneration is required more frequently. In surface or cake filtration, the porosity of the cake decreases as it thickens due to compression and possibly migration of smaller particles into the pores. These effects result in a rapid increase in pressure toward the end of the filtration cycle.

The variable pore size filter of the present invention can be rapidly regenerated by backwashing/forward flushing when it becomes plugged and loaded with particle build-up, as indicated by the pressure drop reaching some predetermined limit. When the filter becomes loaded, or just prior to the filter becoming loaded, its pore size is made to increase substantially by triggering the responsive gel and causing it to collapse. Upon increasing the filter pore size, trapped particles are released from the filter medium and they are flushed away with a backwash/forward flush of fluid. Regeneration by backwashing/forward flushing has considerable advantages for shipboard operation because there is a plentiful supply of water, and additional reagents or drive mechanisms are not required. After the filter has been cleaned, the pores are then made to return to their normal size by triggering the responsive gel to expand, and the filter is returned to the filtration or loading mode.

The step of heating the responsive gel to above the gel's transition temperature can be accomplished simply by backwashing/forward flushing with heated water. Water may be heated, for this specific purpose, in the filter housing or in a small vessel of filtered water provided specifically for backwashing and forward flushing. In addition, there are several potential sources of hot water on ships that might be tapped for this use. Alternatively, the filter medium itself might be heated. One method would be to make the support matrix from low conductivity material and heat it electrically using techniques currently used for the electrical regeneration of activated carbon (See Gold, H., McCoy, J., Harvey, A., Hicks, R. E. "Electrically Conductive Sorption System and Method" U.S. Pat. No. 5,505,825, Apr. 9, 1996). The step of cooling the gel back to below its transition temperature may be accomplished, for example, by simply providing a flow of seawater, which is below the transition temperature of the gel. To more quickly decrease the gel temperature, chilled water may also be contacted with the responsive gel.

The structure of the variable permeability filter systems of the present invention will be described in detail below in relation to a fiber matrix substrate. However, it is to be understood that other substrate materials, for example, reticulated foams and non-woven fibers, may be used in the practice of the present invention.

Figure 5:
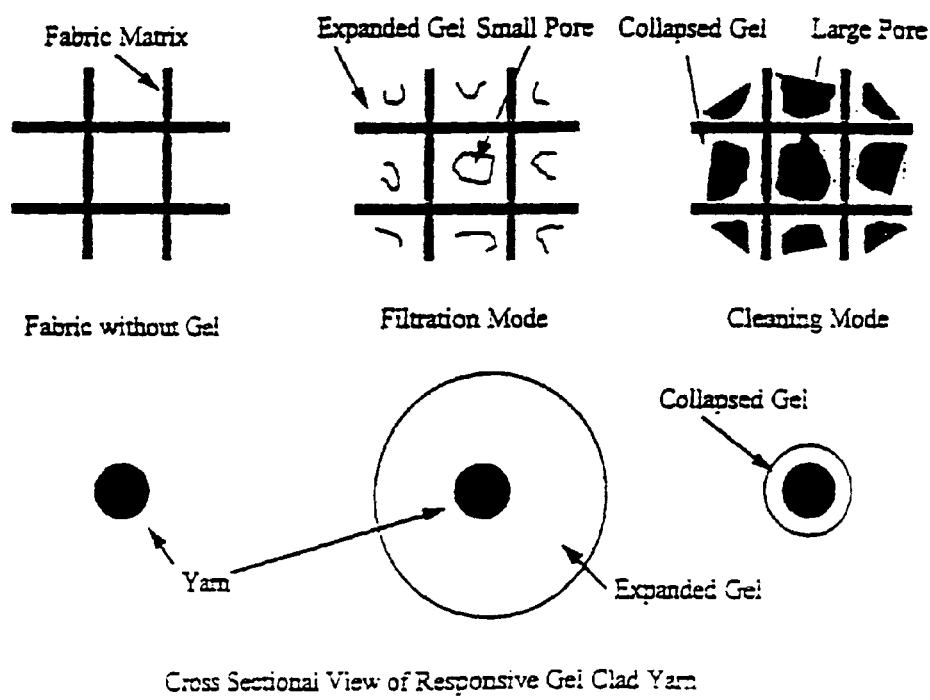
FIG. 5 shows one embodiment of the substrate material in the form of a fiber matrix coated with a responsive gel.
Figure 6:
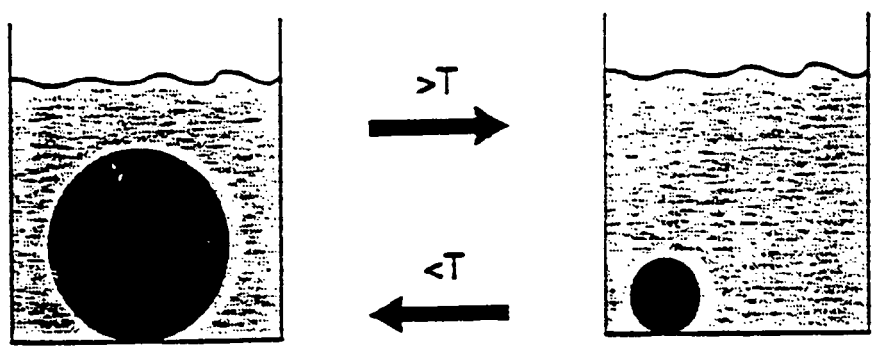
FIG. 6 shows a thermally responsive gel responding to temperature changes above and below the responsive gel's "transition" temperature.

One example of a fiber matrix design is shown in FIG. 5. The fiber matrix has a set pore size and the responsive gel is coated on the fiber matrix. As shown in FIG. 5, the responsive gel is coated on the matrix to leave pores in the matrix. However, the responsive gel may alternatively form a continuous coating. Pores may be formed in the gel coating process by, for example, coating the individual fiber strands prior to weaving the fabric matrix. Alternatively, the pores may be formed by methods such as, for example, by needling and flexing the gel coated or impregnated fabric under tension.

One embodiment of the variable permeability filter system of the present invention is formed by coating a sheet of fabric with the responsive gel as shown in FIG. 5. The mesh size of the fabric and the coating thickness are selected such that when the gel is in its normal or swollen state, the pore size matches the design cutoff particle size, and the variable permeability filter is used in its filtering mode. Collapsing the gel brings the variable permeability filter into the enlarged pore-size state, releasing particles trapped in the filter and allowing the filter to be efficiently cleaned by simple backwashing or forward flushing.

For applications wherein the variable permeability filters are used as prefilters to RO systems on Navy ships to desalinate seawater, the fabric matrix is designed to have a set pore size. For example, one or more variable pore size filters may be located in the prefilter train upstream of an RO system. In such an application, the variable permeability filter system will be designed so as to filter out the targeted cut-off sized particles.

The characteristics of natural seawater that might be encountered by the filters of the present invention are listed in Table 1. The "Best Case" data are representative of open water or "blue water: conditions, and the "Worst Case" data are representative of conditions that might be encountered in certain coastal areas.

TABLE 1

Characteristics Of Seawater

| Property | Value | Best Case | Worst Case |
|---|---|---|---|
| Total Dissolve Solids (TDS) | 25,000-42,000 mg/L | — | — |
| pH Range | 7.0 to 8.4 | — | — |
| Temperature Range | 28 to 95° F. (−2 to 35° C.) | — | — |
| Salt Density Range | — | 5.5 (maximum 15 min)[1] | n/a |
| High Density Suspended Solids | — | 10 mg/L (maximum) (S.G. = 1.7; size = 75 μm)[2] | >1,000 mg/L[3] | n/a, not available
[1]ASTM D4189
[2]S.G. = Specific Gravity
[3]Lisitsyn, A. P. "Distribution and Composition of Suspended Matter in Seas and Oceans" (Raspredelenie i Sostav Vzveshennogo Materiala v Moryakh i Okeanakh). 1961. Translated by M. Slessers. Naval Oceanographic Office, Washington, D.C. 1972. DOD 97-99-BK x739-149 NDN-013-0322-1367-8. AD-739-149.

Thus, the variable permeability filter of the present invention is preferably capable of operating in seawater over a temperature range of 28° F. to 95° F. Preferably, the filter is capable of withstand a temperature change of 18° C. (64.4° F.) in a short time, for example, within a 30 minute time period, as sometimes occurs in ocean waters. In addition, the filter preferably functions in seawater salinities ranging from 25.000 to 42,000 mg/L.

Preferably, the variable permeability filter is designed for a useful operating life of at least one year so that units need be replaced only during routine annual maintenance. The currently used 20 and 3 μm cartridge prefilters, that are preferably located in between the variable permeability filters of the present invention and the RO filter on certain Navy vessels, have life times of 6 to 9 months and reach a final operating pressure differential of around 8 psi.

The variable permeability filters may be used in conjunction with the necessary pumps, fittings, valves or other known fluid transfer and fluid control devices to cause fluid to flow through the filter and be filtered. Means for effecting a change in external environmental condition of the gels may b included in the filtration equipment. For example, the m ans for effecting the change in external environmental condition may be electrical wiring distributed through the composition of matter or gel, such that an electrical current can pass through the wiring and raise the temperature of the composition of matter or gel.

The variable permeability filters of the present invention are operable in both aqueous and non-aqueous environments. In aqueous environments, the variable permeabiltiy filters will operate generally as described above in relation to seawater filtering processes. In aqueous environments, the polymer displays a Lower Critical Solution Temperature (LCST), which furthermore has been crosslinked, such that it displays a change in permeability and porosity. The requirement for the polymer constituting the network of the gel in a non-aqueous environment is that it display an Upper Critical Solution Temperature (UCST). This type of filter could be used in non-aqueous environments for the production of hydrophobic polymer beads, for example, where it is necessary to separate the polymer beads from the solvent in which they were synthesized, for example, toluene. The temperature of the toluene could be maintained above the UCST until the pressure drop across the filter became to high, and then the filter would be backwashed or forward flushed with cold toluene. Alternatively, a hydrophobic polymer which swelled greatly in a single organic solvent and less so in another could be employed. For example, the hydrophobic gel comprising the responsive part of the filter might be swollen in toluene, and thus act to filter out small polymer particles. Yet when backwashed or forward flushed with methanol, in which it did not swell, the porosity and permeability of the filter would increase, releasing trapped particles and regenerating the filter.

All documents mentioned herein are fully incorporated by reference. The variable permeability filters of the present invention will be further illustrated with reference to the following Examples which are intended to aid in the understanding of the present invention, but which are not to be construed as a limitation thereof.

EXAMPLES

General

The synthesis of the variable permeability filters and filter testing was carried out as described below unless otherwise indicated.

For test purposes, the target cutoff particle size was set in the 50 to 60 μm size range. Significantly larger particles that might be present in the seawater are expected to be sufficiently dense to be removed in upstream centrifuges. In practice, the cutoff size can be readily modified by, for example, appropriate selection of the mesh size or permeability of the support material, the thickness of the gel coating, and various parameters selected during the synthesis of the gel (e.g. crosslink density of the responsive gel, initial polymer concentration, polymer molecular weight and branching).

The Filter Substrate

The substrate material must form a permanent bond with the responsive gel, and should be suitable for the construction of a cartridge filter with depth filter characteristics. In addition, the permeability of the substrate matrix should be designed such that the cutoff particle size of the filter with the coated gel will meet the design specification.

Three types of substrate were considered in the Experiments: woven fabric, reticulated foam, and a non-woven matrix.

For the woven fabric, a black cotton standard weave gauze was used. The mesh size was determined by photomicrography and found to be about 370±20 μm. The black color was selected because it increased the contrast between the gel and the fabric, making it easier to observe the gel coating.

The reticulated foams were polyether-polyurethane foams obtained from Rogers Foam, Somerville, Mass. and Crest Foam, Inc., Moonachie, N.J.

The non-woven matrix was prepared from bulk cotton linters and papermaking clay that may be obtained from any craft store. The non-woven matrix was formed as follows: (1) mix the cotton linters (½ sheet), clay (½ teaspoon), and water (3 cups); (2) combine the cotton linters, clay and water in a blender; (3) pour the mixture from the blender into a petri dish which serves as a mold; (4) press the slurry into a ¼ in. thick cake; and (5) bake at about 70° C. (158° F.) for about 3 hours.

The Responsive Gels

Two gels were used in these experiments, namely hydroxypropyl cellulose (HPC) and hydroxypropyl methyl cellulose (HPMC).

The general method used to prepare a HPC polymer gel was to crosslink a basic aqueous solution of the HPC polymer with vinyl sulfone. First, a 0.2 to 10 percent aqueous solution of HPC (Aldrich, 100,000 MW, 15,000 cP for a 2 percent solution) was prepared and allowed to hydrate overnight. Next, sodium hydroxide was added to the solution to bring the pH to above 12. The basic solution was cooled in an ice bath for about 45 min to an hour, and then vinyl sulfone (Aldrich) was added in a ratio of 0.5 to 10 percent of the dry HPC polymer weight. To assure a homogeneous mixture, the solution was stirred vigorously until the onset of gelation. Gelation was allowed to continue overnight. The next day the gel was removed from its container and soaked in fresh distilled water. Ammonium chloride and hydrochloric acid were added to the soaking gel to neutralize it, and the gel was then heated above 55° C. (131° F.) to collapse it. The collapsing process expels uncrosslinked polymer and residual monomer from the gel along with the water. The gel was then cooled, allowed to swell once more in water, and then the heating and collapsing process was repeated a few more times.

A similar procedure was used to prepare the HPMC polymer gel, with the exception that the starting polymer, HPMC (SIGMA) had a starting viscosity of 40 to 60 cP in a 2 percent solution.

Example 1

Design of a Gel Coated Fabric Matrix

Two approaches may be used for preparing a gel-coated fabric matrix. In one approach, the gel is applied to the woven fabric. The second approach is to coat the yarn or fibers first, and then weave or knit the coated material to form the fabric. In these experiments, the first method was used. However, in practice, either approach may be used.

Several methods of coating the woven fabric using cross-linkers were tested. In one, the fabric was immersed in HPC polymer while it was cross-linking. In another, the fabric was soaked in crosslinker, transferred to a solution of the HPC, and then placed in a petri plate where the reaction was allowed to go to completion.

The effect of polymerizing the film at temperatures above and below the transition temperature of the polymer was also examined. These tests were done with HPC. One set of films was polymerized at 75° C. (167° F.), and one set at room temperature. Each test included a film that contained the cotton fabric substrate and a control that did not. The gel that was polymerized above the transition temperature formed a white, opaque film that adhered well to the fabric matrix, but did not show any temperature response. The gel that was cured at room temperature did show temperature response, as expected.

These coating tests indicated that HPC and HPMC gels can be successfully attached to cotton fabric. Observations under the microscope and flow tests (see below) indicated that increasing polymer solution and cross-linker concentrations resulted in improved strength of the gel and of the gel-substrate bond. In practice, concentrations are preferably limited to a maximum of about 10 percent to avoid difficulties in mixing the solutions and also for reasons of cost.

The preferred coating method is to cast a film of gel on the fabric and then allow it to polymerize. Gel films were cast using 10 percent by weight polymer solution to which 10 percent vinyl sulfone crosslinker had been added. The cross-linking percent is calculated as the weight of crosslinker per unit weight of polymer. The crosslinked gel was coated onto both sides of the fabric which was then sandwiched between two glass plates while the gel cured. The glass plates were separated by tape to provide spacing (film thickness) of about 300 µm.

Although the gel film on the fabric appeared continuous and impermeable, test showed that the medium was permeable to water flow. Optionally, pores may be formed in the filter by, for example, needling or flexing the filter system under tension.

Example 2

Reticulated Foam Matrix

One concern in impregnating the reticulated foams with the responsive gel was that the polyurethane used for chemical pretreatment might not be stable in the highly basic solutions which are needed to activate the cellulose for cross-linking with vinyl sulfone. Another concern was that the cellulose gel might not bond to the foam. Samples of the reticulated foam, obtained from Crest Foam, Inc., Moonachie, N.J., were placed in water and in concentrated base to test their wetting characteristics and stability. The foams were wet well by the water. After two days of soaking in sodium hydroxide solution (pH>12), no obvious hydroylsis had occurred. Several attempts were then made to cross-link HPMC inside the foam. Small portions of the foam were soaked in HPMC gel and then allowed to cure. These tests showed that a good foam-gel bond could be obtained, but that a more controlled technique such as drawing the solution into the foam under vacuum would be required to obtain a coating thickness that is uniform or that increases progressively with depth.

Example 3

Non-Woven Matrix

Two methods of converting the paper into a variable permeability filter may be used. In one method, the prepared paper is soaked with gel solution while cross-linking. In the second method, hydrated, crushed gel beads are combined with the cotton linters when making the paper.

The first method was used in these experiments. However, either method may be used in forming the non-woven matrix. The procedure used was as follows: prepare a 10 percent by weight solution of basic aqueous HPMC. This solution, which was more viscous than similar solutions of HPC, was chilled for 1 hr before adding vinyl sulfone crosslinker at 10 percent of the dry weight of the HPMC. The solution was stirred vigorously and then the dry paper cake was soaked in it. Cross-linking was allowed to proceed overnight.

Example 4

Gravity Flow System

Two test loops were built to conduct the flow tests of the variable permeability filters: (1) a small gravity flow system was used to determine changes in permeability resulting from phase transition, and (2) a larger system was used for carrying out filtration and backwash/forward flush tests.

The equipment used for the flow tests consisted essentially of a 100 ml burette connected by a short section of tubing to a plastic filter holder fitted with an air vent. A heating tape was wrapped around the burette to help maintain elevated temperatures. The filter holder was filled under water to remove all air bubbles and immersed in a constant-temperature water bath. In the case of the seawater tests, a 10 liter beaker and an immersion heater (Cole-Parmer) was used instead of the constant-temperature water bath which might have corroded. Temperature control was less precise in this case (±2° C. instead of ±1° C.). The rest of the equipment remained the same. Tests were made with DI and seawater to determine the difference in flow rate through the fabric when below and above the transition temperature.

Example 5

Filtration Test Loop

Figure 8:
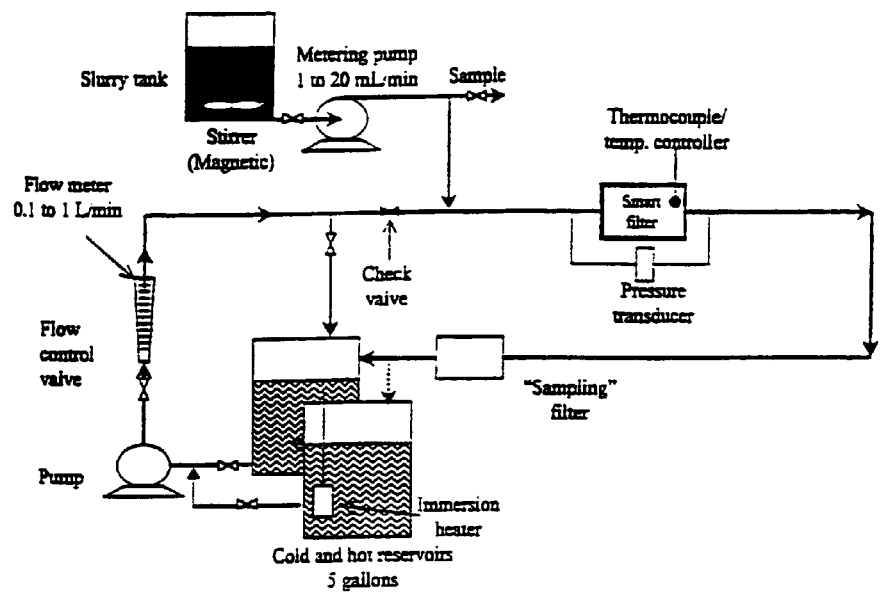
FIG. 8 shows a flow loop used for filtration tests in testing the variable permeability filters of the present invention.

The flow loop used for the filtration tests is shown in FIG. 8. The system is similar to equipment used for routine filter tests (See Swiezbin, J. R.; Uberoi, T.; Janas, J. J. "Sizing up disposable cartridge filters." *Chemical Engineering*, 103(1), 104-108, January, 1996). It consists of two water storage reservoirs, a centrifugal pump, a flow meter, the filter module, and a back-up filter. One reservoir was used for water at room temperature, while the water in the second reservoir was kept above the transition temperature using an immersion heater and temperature controller. The test particles (Sil-Co-Sil 75 ground silica from U.S. Silica) were kept in suspension in a stirred beaker and fed into the circulating water just upstream of the filter module using a metering pump. After flowing through the filters, the particle-free circulating water returned to the storage reservoir. A 0 to 10 psi differential pressure gauge (Dwyer Capsohelic) placed across the variable permeability filter was used to monitor the degree of loading of the filter. The filter module can be reversed for backwashing the filter. This operational feature, however, is not needed since the variable pore size filter of the present invention can be completely regenerated by forward flushing.

Figure 9:
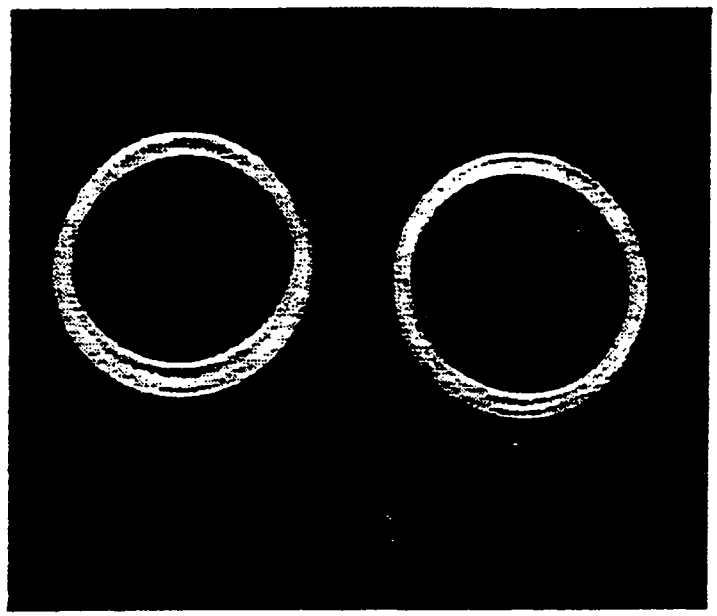
FIG. 9 shows a snap-ring assembly used to hold a gel-coated fabric matrix in place in accordance with one embodiment of the present invention.
Figure 10:
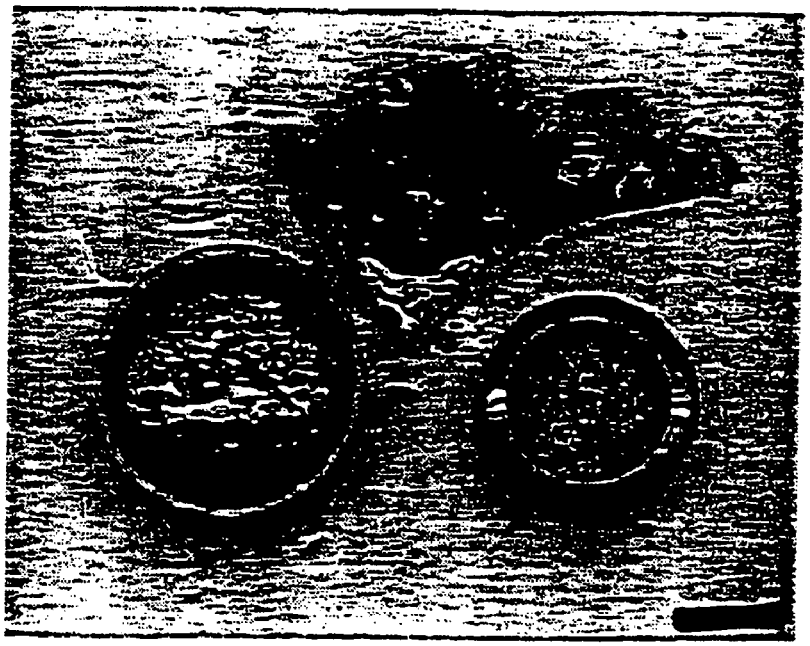
FIG. 10 shows one embodiment of the snap-ring assembly holding a gel-coated fabric matrix under slight tension.
Figure 11:
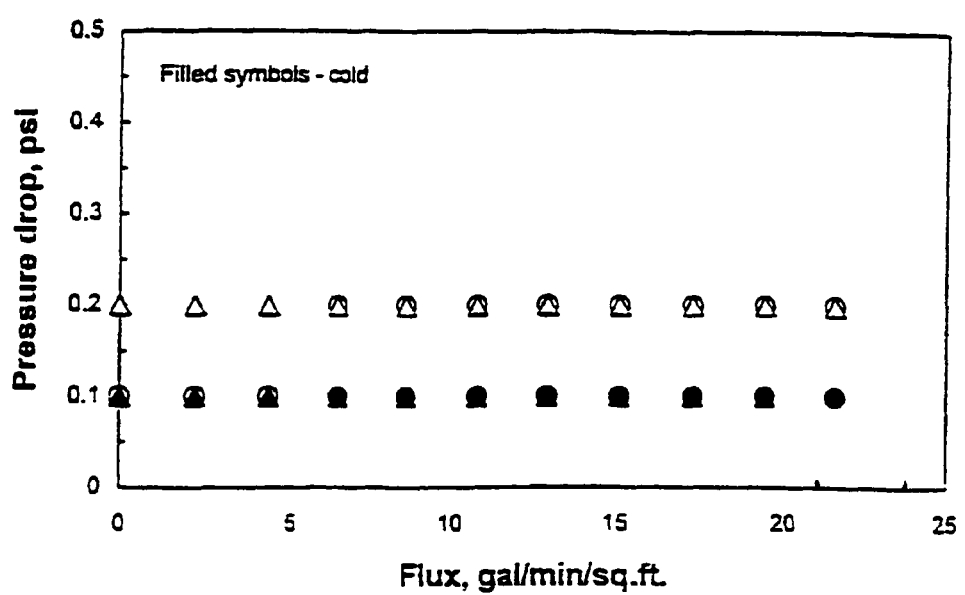
FIG. 11 shows a plot of experimental results of flux and pressure drop changed of a control.

The gel-coated fabric filter media was held in place in the filter housing the snap ring assembly shown in FIG. 9. Disks cut from the cured, gel-coated fabric were placed on the support ring, and a second slightly smaller ring then "snapped" into place. The smaller ring held the coated fabric under slight tension in the outer ring as shown in FIG. 10. The filter used in the experiments was 1.5 inches in diameter. The ring assembly was designed to hold multiple layers of fabric. Tests were done over a flux range of 1 to 22 gpm/ft$^2$ (face velocity of 0.13 to 2.9 ft/min) The lower flows are more in line with operational practice, while the higher rates were used to provide a severe, dynamic test of the gel-substrate bond strength and integrity of the filter medium.

The rate of loading the filter was controlled by adjusting the slurry concentration, the slurry injection rate, and the filter flux. Both reservoirs contained synthetic seawater. Water from the cold reservoir was used during the filtration cycle, and water from the heated reservoir was used for flushing. Separate backup filters were used to collect the particles that bypass the filter during filtration and that are removed from the filter by flushing. The amount and size distribution of the particles collected during each mode of operation were used to determine filter performance. The pressure drop across the filter at the start of a cycle and after flushing was used to assess the effectiveness of the flushing process.

Example 6

Transition Temperatures

Transition temperatures were detected under the microscope by heating the gel slowly and noting the point where precipitation occurred. Transition temperatures of HPC gels (10 percent polymer solution, 10 percent cross-linking level) in DI (deionized) and in sea water, and of HPMC gel (also 10 percent polymer solution, 10 percent cross-linking level) in several concentrations of salt waters are summarized in Table 2.

There was some hysteresis observed when the process was reversed and the gel/fabric samples were cooled, but the transition temperatures are considered to be accurate to within a few degrees.

TABLE 2

Transition Temperature of HPC and HPMC in Deionized Water and Salt Water

| | Transition Temperature (° C., ° F.) | |
|---|---|---|
| | HPC | HPMC |
| DI Water | 45° C., 113° F. | ND |
| 15 g/L NaCl | ND | 66-68° C., 150.8-154.4° F. |
| 24.53 g/L NaCl ** | 37° C., 98.6° F. | 60-62° C., 140-143.6° F. |
| 45 g/L NaCl | ND | 56-59° C., 132.8-138.2° F. |

** Synthetic seawater
ND not determined

The transition temperature of around 60° C. (140° F.) for the HPMC gel in seawater is considered acceptable for practical use. It is sufficiently far above the maximum expected operating temperature of 35° C. (95° F.) to avoid partial gel collapse during operation, vet not so high as to result in high energy consumption for backwashing/forward flushing.

Example 7

Filter Permeability

The gravity flow apparatus described above in Example 4 was used to determine permeability changes through HPMC-coated fabrics when above and below the transition temperature. Three experiments were performed, one with the gel-coated fabric in the filter holder, and two controls. In one control, an uncoated fabric was placed in the holder, and in the other control, the filter holder was empty. The controls were run to confirm that any difference measured in the flow rate was due to the temperature transition response of the gel and not to other temperature-related effects. For example, it is known that the viscosity of water decreases from 1.002 to 0.404 mPa·s as the temperature increases from 20 to 70° C. (68 to 158° F.) (See *Handbook of Chemistry and Physics*. 76th Ed. CRC Press, Boca Raton La. Page 6-10 1995). This change in viscosity could result in an equivalent increase in flow rate were the dominant resistance to flow due to viscous losses.

The time taken for 100 ml of water to flow from the burette through the filter holder were compared at a low, intermediate, and high temperature. During the tests, the gel-coated fabric was cycled several times above the transition temperature. Two sets of data were obtained and similar results obtained each time. The results are summarized in Table 3 for deionized water and in Table 4 for ASTM standard seawater.

TABLE 3

Flow Rate of Deionized Water Through Filter Unit

| | Average Flow Rate (mL/s) | | |
|---|---|---|---|
| | 17° C., 62.6° F. | 35° C., 95° F. | 70° C., 158° F. |
| Gel-coated fabric | 0.68 | 0.78 | 0.94 |
| Uncoated fabric | 0.87 | 0.90 | 0.94 |
| None | 0.89 | 0.90 | 0.94 |

TABLE 4

Flow Rate of Synthetic Sea Water Through Filter Unit

| | Average Flow Rate (mL/s) | | |
| --- | --- | --- | --- |
| | 20° C., 68° F. | 35° C., 95° F. | 65° C., 149° F. |
| Gel-coated fabric | 0.77 | 0.89 | 0.93 |
| Uncoated fabric | 0.89 | 0.92 | 0.94 |
| None | 0.89 | 0.92 | 0.94 |

In the presence of the gel-coated fabric, the flow rate of DI water through the system increased by 38 percent from 0.68 to 0.94 mL/s on increasing the temperature from 17 to 70° C. In the control experiments, the flow rate increased by 8 percent or less, indicating that the measured flow increase in the presence of the coated fabric is indeed due to the collapse of the gel above the transition temperature. In the tests with seawater, the increase in flow rate was about 21 percent in the presence of the gel-coated fabric compared to less than 6 percent for the controls. In these tests, the temperature increase was from 20 to 65° C. A comparison of flow rates for the two types of water through the gel-coated fabric showed that the flow rate at 20° C. in seawater was about the same as the flow rate at 35° C. with DI water. This is to be expected in view of the lower transition temperature in the presence of seawater.

Example 8

Performance of the Variable Permeability Filter

Performance tests were carried out using the filter test loop described above in Example 3 and shown in FIG. 8. All the filters tested were prepared by creating a film of hydroxypropyl methyl cellulose (HPMC) gel on a 370 μm mesh cotton fabric. The prepared filters consisted either of a single layer (one-ply) or a double layer (two-ply) of fabric. A control filter consisting of a single layer of uncoated fabric was also tested.

All the tests were conducted in synthetic seawater. For filtration runs, a concentrated slurry of Sil-Co-Sil 75 ground silica (U.S. Silica) was injected into the seawater just upstream of the filter. When operating in the filtration mode (swollen gel), the seawater temperature was kept in the range 22±5° C.; the seawater used for flushing (collapsed gel) was 65±5° C.

Example 9

Flux and Pressure Drop Tests

These tests were performed with clean seawater (no particles added) at the low and high temperatures to determine whether the gel coating swelled and collapsed as expected and whether the resulting change in permeability had a measurable effect on the pressure drop across the filter. Tests were done with the control (no gel coating), two one-ply filters, and one two-ply filter. Fluxes were in the range of 2 to 25 gpm/ft$^2$, covering the range from typical to very high filtration rates. The results are summarized in FIGS. 11 to 14.

As expected, the pressure drop across the control filter (FIG. 11) was essentially negligible. Further, there was no significant change in pressure drop across the control when operating with warm or with cold water. Virtually identical results were obtained on repeated runs.

Figure 12:
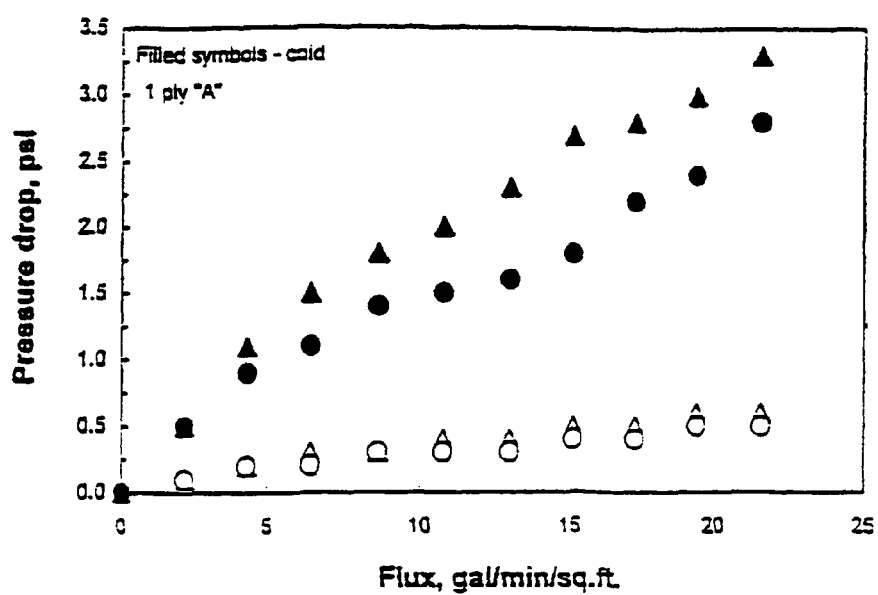
FIG. 12 shows a plot of experimental results of flux and pressure drop changed of a one-ply gel coated fabric matrix "A".
Figure 13:
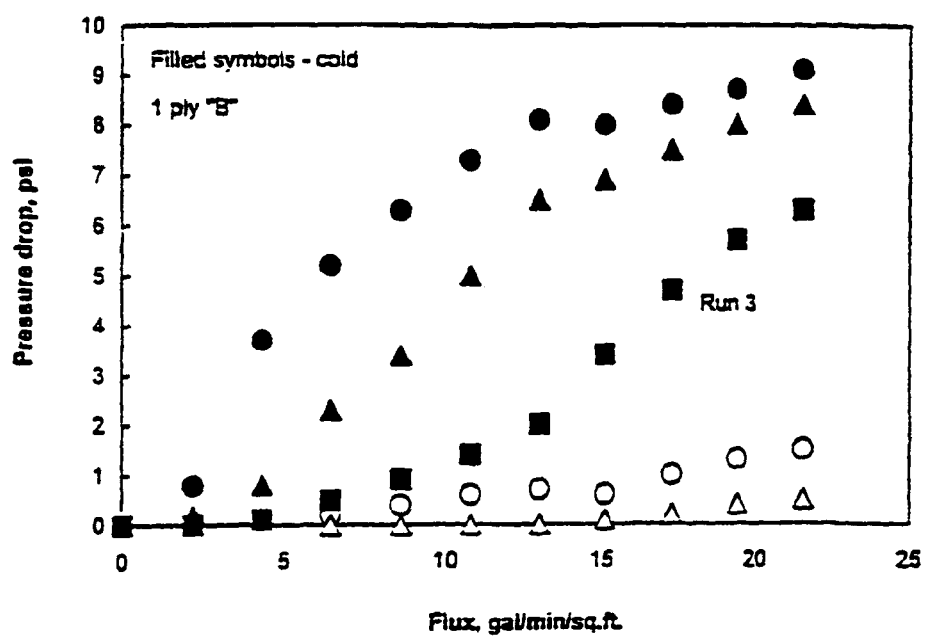
FIG. 13 shows a plot of experimental results of flux and pressure drop changed of a one-ply gel coated fabric matrix "B".
Figure 14:
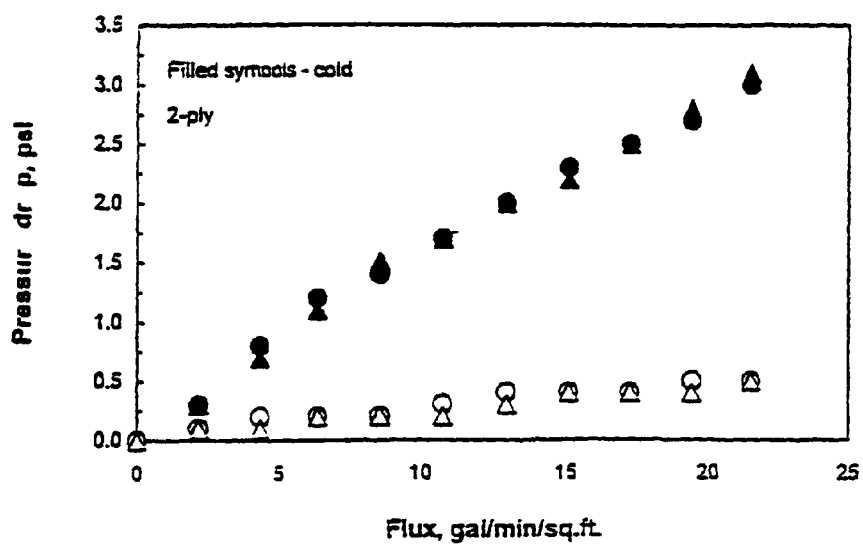
FIG. 14 shows a plot of experimental results of flux and pressure drop changed of a two-ply gel coated fabric matrix.

The pressure drop behavior changed dramatically when switching to gel-coated fabrics (FIGS. 12 to 14). These filters showed significantly different pressure drops when operating in the swollen and collapsed mode. When in the swollen mode, the pressure drop was relatively high and increased with increasing flux. In the collapsed mode, the pressure drop remained relatively low. In comparison with the behavior of the control filter (FIG. 11), it is clear that the gel coating was responding to temperature as expected, and that the gel-coated fabric was behaving like a variable permeability filter.

The pressure drop across the two-ply filter (FIG. 14) was about the same as that of the one-ply filter A (FIG. 12), and about half that of the one-ply filter B (FIG. 13). The difference in pressure drop among the different filters appears to be mainly due to variations in the thickness of the gel film on the fabric. However, it is possible that some of the variation in pressure drop may be due to differences in the inherent permeability of the gel. This permeability may be related to manufacturing techniques including the amount of cross-linking, as well as to imperfections in the gel film itself. In addition, the stress placed on the fabric when snapping it into the ring support could mechanically degrade the gel/fabric bond, particularly around the outer diameter of the filter where most of the flow occurs.

The test results also indicated that repeat runs behaved differently for the different filters. In the case of the two-ply filter, the pressure drops were essentially identical in the repeat runs. In the case of one-ply filter A (FIG. 12), the pressure drops in the second run were higher by about 0.5 psi (17 percent) at the higher flow rates. In the case of one-ply filter B (FIG. 13), the pressure drop decreased in each of two repeat runs, with the difference being most pronounced at the lower flow rates. This decrease in pressure drop might be ascribed to poor gel/fabric bonding and loss of gel from the fabric with time. However, the data showed a definite "recovery" in pressure drop at higher flow rates—see for example Run 3 in FIG. 13. This behavior suggests that in the case of one-ply filter B, the gel was not fully swollen at the start of the cold runs. In addition, it is also possible that the filters need to undergo several swell/collapse conditioning cycles before they settle down to steady behavior.

Example 10

Test Particle Characteristics

The density and size distribution of the Sil-Co-Sil 75 ground silica were determined by P/M Lab at Penn State (See Campbell, L.; Cowan, K. "Particle Size Analysis of Silica." Analysis Report submitted to Foster-Miller, Inc. P/M Lab, Department of Engineering Science and Mechanics, Pennsylvania State University, University Park, Pa. May 27, 1999: and Cowan, K. Letter and data submitted to Foster-Miller, Inc. P/M Lab. Department of Engineering Science and Mechanics, Pennsylvania State University, University Park, Pa. Jun. 4, 1999). The density was measure using a Micrometrics AccuPyc 1330 helium pycnometer and found to be 2.66 kg/L. Particle size distributions were determined on a TSI AeroSizer, a Coulter LS230 (laser diffraction), and PSS 770A (light blockage). The mean size data are summarized in Table 5.

TABLE 5

Measured Particle Sizes of the Sil-Co-Sil 75

| Instrument | $D_{10}$, μm | $D_{50}$, μm | $D_{90}$, μm |
|---|---|---|---|
| TSI AeroSizer | 8.5 ± 0.5 | 19 ± 1 | 31 ± 1 |
| Coulter LS230 | 3.98 ± 0.05 | 20.5 ± 0.2 | 66.1 ± 0.5 |
| PSS 770A | 3.3 ± 0.2 | 8.5 ± 0.6 | 17.2 ± 0.1 |

The Coulter data showed the closest agreement with values obtained from the manufacturers data ($D_{50}$=22 μm and $D_{90}$=51 μm) and was selected as the test instrument for determining the size distribution of samples obtained during the filtration tests.

Example 11

Filter Efficiency

Figure 15:
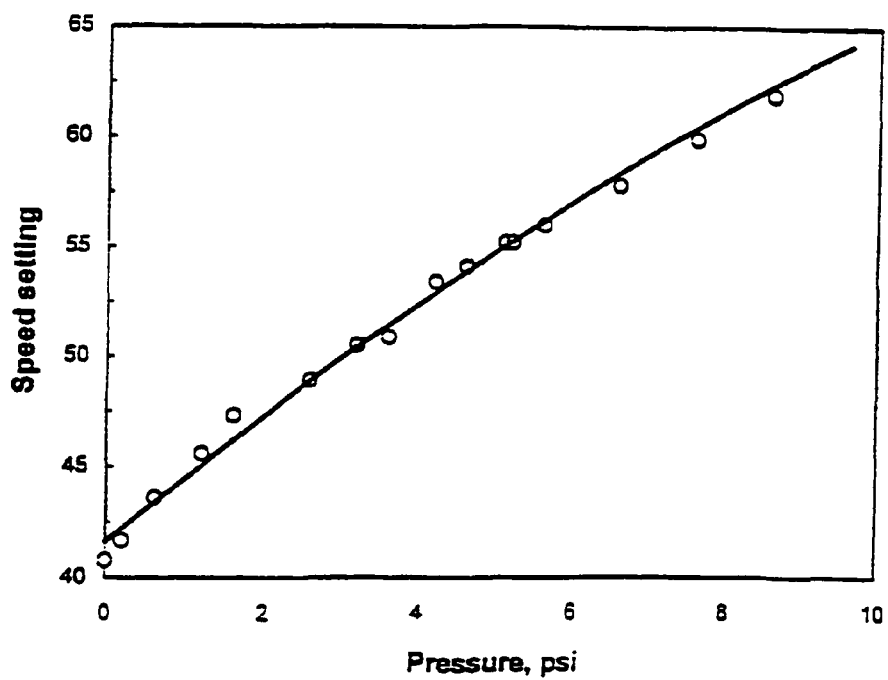
FIG. 15 shows a calibration curve used to set the test flow rates through the variable permeability filter in Example 11.

The particles were suspended in a slurry and injected into the seawater stream using a peristaltic pump. To maintain a constant injection rate, the speed of the peristaltic pump had to be increased to compensate for the increasing backpressure as the pressure drop across the filter increased. The required speed setting is shown in the calibration curve of FIG. 15.

The procedure for running the filter tests was to filter the particle-laden seawater at a fixed flow rate while monitoring the pressure drop across the filter. When the pressure drop became excessive, the run was stopped and the filter was flushed with a flow of warm seawater until the pressure returned to near its original clean value. For these tests, the flushing was done in the same direction as the filtration, so the trapped particles had to be flushed through the filter (forward flushing). This provided a more severe test of the particle release capabilities of the filter than would have been attained by backwashing.

Figure 16:
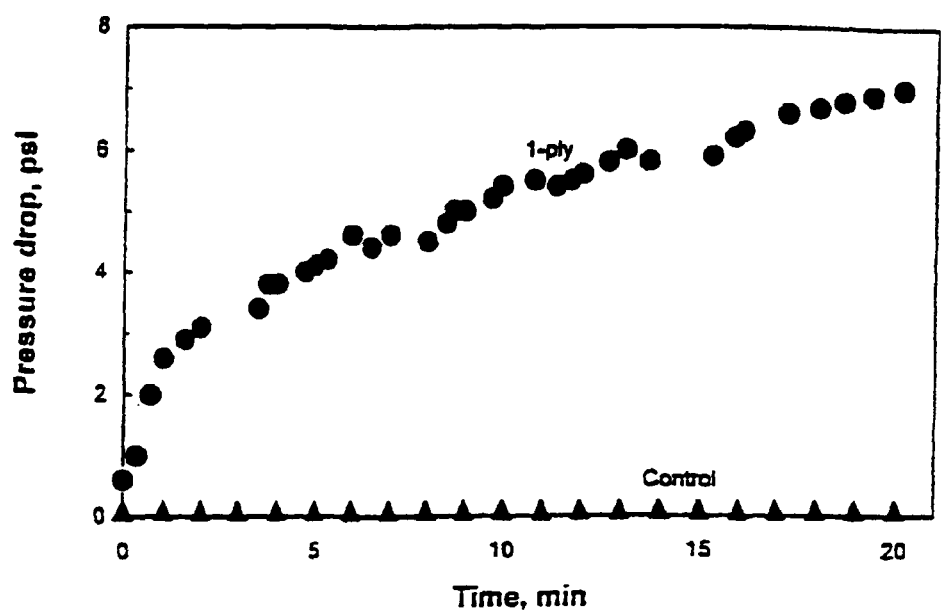
FIG. 16 shows pressure as a function of time across a control and one-ply gel coated fiber matrix.

Plots of pressure drop against time are shown in FIG. 16 for the control and a one-ply filter. The pressure drop across the one-ply filter increased from near zero to about 7 psi over a time period of 20 min of filtering seawater containing 100 mg/L of the silica particles at a flux of 10.7 gal/min/ft². The control showed no change in pressure drop over the same time period. On flushing the filter with 65° C. (149° F.) seawater, the pressure drop returned rapidly to near its original value of about 0.5 psi. The amount of water required for flushing could not be determined accurately as most of the flush water served to heat the tubing and filter. The pressure drop returned to its initial value within about 30 seconds of the temperature of the discharge stream reaching the transition temperature.

The amount of particles remaining in the filtered seawater and the amount of particles removed from the smart filter during the flushing process were used to calculate the fraction of particles that were trapped. The results are summarized in Table 6.

TABLE 6

Calculated Particle Capture (Flux = 10.7 gal/min/ft²)

| Run No. | Filter | Particle Loading (mg/L) | Percent of Particles Trapped (%) |
|---|---|---|---|
| 1 | Control | 100 | 13.3 |
| 2 | One-Ply | 100 | 33.9 |
| 3 | One-Ply | 10,000 | 33.1 |
| 4 | One-Ply | 10,000 | 49.0 |
| 5 | Two-Ply | 10,000 | 26.7 |

Figure 17:
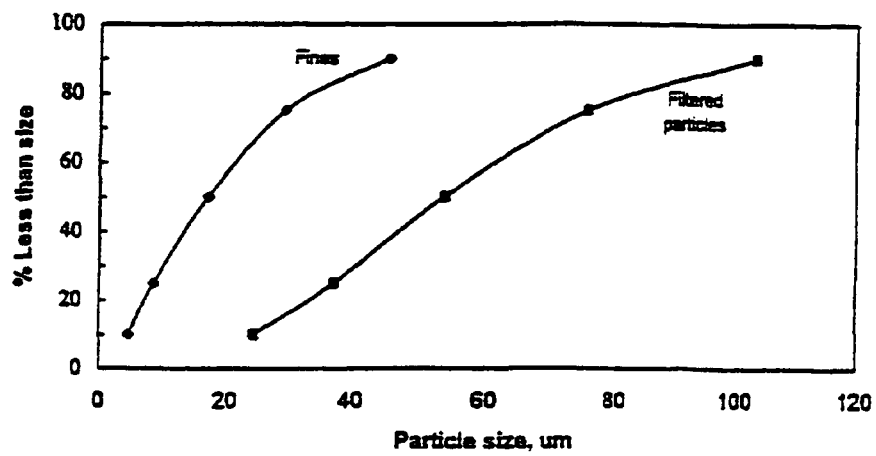
FIG. 17 shows the particle size distribution of the particles trapped in Example 11, Run 4.
Figure 18:
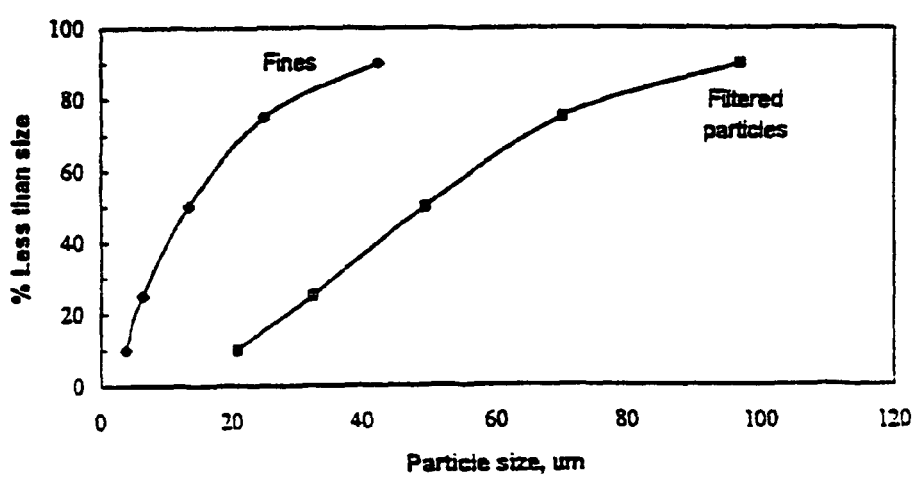
FIG. 18 shows the particle size distribution of the particles trapped in Example 11, Run 5.

The filtrate collected during the filtration cycle remained cloudy on standing, indicating that the particles that passed through the filter were mainly fines. In contrast, the particles in the flushing water settled immediately, indicating that the particles that were trapped by the smart filter were relatively coarse. The difference in particle size could also be discerned tactilely. Particles collected in Runs 4 and 5 were sent out for particle size analysis. The size distribution data are summarized in Table 7 and confirm the observations that the particles that bypassed the filter (the fines) were significantly finer than those that were trapped. The data are shown graphically in FIG. 17 for Run 4 and in FIG. 18 for Run 5.

TABLE 7

Particle Size Distributions Of The Filtered And Fine Particles

| | Particle Size (μm) | |
|---|---|---|
| Run No. | Fines | Filtered |
| 4 | 17.5 | 53.8 |
| 5 | 13.2 | 49.5 |

The particle size distributions (FIGS. 17 and 18) and the fractional removal data (Table 6) were used to calculate the removal efficiency attained by the smart filter for specific particle size ranges. These data are summarized in Table 8, and show the expected low removal efficiency for fine particles smaller than 20 mm and good removal for the coarser particles greater than 60 μm The single-ply filter (Run 4) had a cut-off particle size close to 20 μm whereas that for the two-ply filter was closer to 60 μm. The two-ply filter also had a lower pressure drop which is consistent with its higher cut-off particle size.

TABLE 8

Variable Permeability Filter Particle Removal Efficiencies

| | Removal Efficiency (%) | |
|---|---|---|
| Particle Size Range | Run 4 | Run 5 |
| <20 μm | 11 | 5 |
| 20 to 40 m | 43 | 29 |
| 40 to 60 m | 72 | 52 |
| >60 m | 93 | 87 |
| Overall | 49.1 | 26.7 |

Example 12

Preparation of a Variable Permeability Filter from N-Isopropylacrylamide

N-isopropylacrylamide (0.1 mol) and N,N-methylenebisacrylamide (0.005 mol) were weighed out and dissolved in 100 mls deionized water in an erlenmeyer flask. The flask was closed with a septum and nitrogen was bubbled through the solution for an hour to remove oxygen. 0.00 μmols of ammonium persulfate, an initiator, were weighed out in a separate vial. A cotton gauze cloth into which had be n sewn stainless steel thread was prepared and placed on a glass plate. The purpose of the steel thread was to act as an electrical heating element to cause the gel to collapse. All equipment and solutions were then introduced into a glove bag which was purged several times with nitrogen. Once all oxygen had been removed from the environment, the initiator was stirred into the monomer solution and the pre-gel solution was poured onto the cloth. A rubber seal was used to contain the pre-gel solution as it solidified. The isopropylacrylamide impregnated cloth was suitable for use as a variable porosity filter medium.

Although a preferred embodiment of the invention has been described using specific terms, such description is for illustrative purposes only, and it is to be understood that changes and variations may be made without departing from the spirit or scope of the following claims.

What is claimed is:

1. A process for filtering seawater comprising:
   (a) providing a filter system comprising a substrate and a responsive gel, wherein responsive gel is hydroxypropylcellulose (HPC) or hydroxypropyl methyl cellulose (HPMC),
   the substrate having a predetermined permeability, and the responsive gel coating or impregnating the substrate,
   wherein the responsive gel is coated or impregnated such that shrinkage and expansion of the gel in response to a change in environmental condition alters the permeability of a fluid through the filter system;
   (b) causing the responsive gel to expand so as to decrease the permeability of a fluid through the filter system;
   (c) passing seawater through the filter system to entrap or filter particles from the seawater;
   (d) causing the responsive gel to shrink so as to increase the permeability of a fluid through the filter system;
   (e) removing or cleaning the entrapped particles from the filter system by passing water through the filter system; and
   (f) optionally repeating steps (b)-(e) one or more times.

2. The process of claim 1 further comprising changing the permeability of the filter system before, during and/or subsequent to passing the seawater through the filter system by effecting said change in said environmental condition.

3. A filter system for filtering seawater comprising:
   a substrate comprising a matrix, mesh, or reticulated foam having pores, the pores having a first pore size and providing a predetermined permeability; and
   a responsive gel having reversible expanded state and a collapsed state, the responsive gel coating or impregnating the substrate to close off the pores to some extent, wherein the responsive gel is hydroxypropylcellulose (HPC) or hydroxypropyl methyl cellulose (HPMC),
   wherein the expanded responsive gel provides an expanded pore size less than the first pore size, and the collapsed responsive gel provides a collapsed pore size greater than the expanded pore size and less than the first pore size,
   wherein the responsive gel collapses and expands reversibly in response to a change in environmental condition to provide a variable pore size ranging between the collapsed pore size and the expanded pore size.

4. The filter system of claim 3, wherein the change in an environmental condition is selected from the group consisting of temperature, solvent composition, pH, presence of ions, ionic strength, presence of light, presence of electric field, presence of magnetic field and pressure.

5. The filter system of claim 3, wherein the substrate material comprises a depth filter.

6. The filter system of claim 5, wherein the depth filter is formed using yarn, woven fabric, reticulated foam or non-woven fibers.

7. The filter system of claim 3 further comprising
   the necessary pumps, fittings, valves or other fluid transfer and fluid control devices to cause seawater to flow through said filter system of claim 3 and be filtered.

8. The filter system claim 7 wherein the filter system further comprises means for effecting a change in environmental condition.

9. The filter system of claim 8, wherein said means for effecting the change in environmental condition comprises electrical wiring distributed through the responsive gel in which electrical current can pass through the wiring and raise the temperature of the responsive gel.

10. The filter system of claim 9, wherein the change in an environmental condition is a temperature change.

11. The filter system of claim 3, wherein the change in volume of the responsive gel changes reversibly in response to said change in said environmental condition.

12. The filter system of claim 3, wherein the HPC or HPMC is cross-linked.

13. The filter system of claim 12, wherein the cross-linker is derived from a polyacid.

14. The filter system of claim 13, wherein the cross-linker is adipic acid based or succinic acid based.

15. The filter system of claim 14, wherein the cross-linker is adipoyl chloride or succinyl chloride.

16. The filter system of claim 3, wherein the responsive gel has a transition temperature of greater than about 95° F.

17. The filter system of claim 3, wherein the responsive gel has a transition temperature greater than about 95° F. in seawater.

18. The filter system of claim 3, wherein the expanded pore size ranges from about 20-60 µm.

19. The filter system of claim 3, wherein the responsive gel comprises interstitial pores of voids, and the volume of said interstitial pores or voids changes in response to said change in an environmental condition, thereby further changing the permeability through the filter system.

20. The process of claim 1, wherein the step of passing seawater through the filter system to entrap or filter particles from the seawater comprises desalinating the seawater.

* * * * *